US008296286B2

(12) United States Patent
Tanaka et al.

(10) Patent No.: US 8,296,286 B2
(45) Date of Patent: Oct. 23, 2012

(54) DATABASE PROCESSING METHOD AND DATABASE PROCESSING SYSTEM

(75) Inventors: Michiko Tanaka, Kokubunji (JP); Kazutomo Ushijima, Fuchu (JP); Akira Shimizu, Kokubunji (JP); Seisuke Tokuda, Hachioji (JP); Shinji Fujiwara, Sagamihara (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 12/712,662

(22) Filed: Feb. 25, 2010

(65) Prior Publication Data

US 2010/0293156 A1 Nov. 18, 2010

(30) Foreign Application Priority Data

May 13, 2009 (JP) ................................. 2009-116517

(51) Int. Cl.
*G06F 17/30* (2006.01)
(52) U.S. Cl. ...................................................... 707/711
(58) Field of Classification Search .................. 707/803, 707/711, 805
See application file for complete search history.

(56) References Cited

U.S. PATENT DOCUMENTS

| 8,010,949 B2 * | 8/2011 | Barsness et al. ............... 717/129 |
| 8,090,710 B2 * | 1/2012 | Barsness et al. ............... 707/713 |
| 2007/0022100 A1 | 1/2007 | Kitsuregawa et al. |
| 2007/0233644 A1 * | 10/2007 | Bakalash et al. .................. 707/2 |
| 2009/0125678 A1 | 5/2009 | Tokuda et al. |
| 2010/0211577 A1 * | 8/2010 | Shimizu et al. ............... 707/752 |

FOREIGN PATENT DOCUMENTS

| JP | 10-187745 | 7/1998 |
| JP | 2007-034414 | 2/2007 |

OTHER PUBLICATIONS

Takashi Sato, "Partitioned Indexes Formed in Log-structure", The Institute of Electronics, Information and Communication Engineers, the 18th IEICE Data Engineering Workshop Publication (DEWS2007 C1-2), [online] Japan, IEICE Data Engineering Technical Group, Jun. 1, 2007, pp. 1-4.
Takashi Sato, et al., "Partitioned XML-DB Indices Enabling to Overlap Search and Update", DEWS 2005 Publication (DEWS2005 2A-i5) [online], Japan, IEICE Data Engineering Technical Group, May 2, 2005, pp. 1-4.
U.S. Appl. No. 12/543,826, filed Aug. 19, 2009, Shimizu et al.
Daniel P. Bovet et al., "Understanding the Linux Kernel Third Edition", O'Reilly Media Inc. pp. 560-598.

* cited by examiner

*Primary Examiner* — Cheryl Lewis
(74) *Attorney, Agent, or Firm* — Antonelli, Terry, Stout & Kraus, LLP.

(57) ABSTRACT

Provided is a database processing system including: a computer for outputting data in response to a received query request; and a storage system including a storage device for storing the data, in which: the storage device stores a plurality of partial indices indicating a storage location of the data; the data stored in the storage device is grouped; and the computer is configured to: receive the query request for the data; acquire one of the plurality of partial indices; specify, based on the query request for the data and the acquired one of the plurality of partial indices, a location at which the requested data is stored; and send a request to acquire the data stored at the specified location to the storage system. Accordingly, in the database processing system, a time period necessary to input and output the data is shortened.

16 Claims, 28 Drawing Sheets

| LOGICAL ADDRESS | PHYSICAL ADDRESS | |
|---|---|---|
| | HDD NUMBER | CHS |
| 0x00000000 ~ 0x00000fff | 01 | 000000 ~ 0000ff |
| 0x00001000 ~ 0x00001fff | 02 | 000000 ~ 0000ff |
| 0x00002000 ~ 0x00002fff | 03 | 000000 ~ 0000ff |
| 0x00003000 ~ 0x00003fff | 01 | 001000 ~ 0001ff |
| 0x00004000 ~ 0x00004fff | 02 | 001000 ~ 0001ff |
| 0x00005000 ~ 0x00005fff | 03 | 001000 ~ 0001ff |

*FIG.4*

| SALES ID | CUSTOMER ID | ITEM ID | QUANTITY |
|---|---|---|---|
| 0001 | CustA | Item001 | 1 |
| 0002 | CustA | Item003 | 4 |
| 0003 | CustD | Item001 | 2 |
| 0004 | CustB | Item001 | 3 |
| 0005 | CustB | Item002 | 3 |
| 0006 | CustB | Item003 | 4 |
| 0007 | CustA | Item001 | 1 |
| 0008 | CustC | Item002 | 2 |
| 0009 | CustC | Item003 | 3 |
| 0010 | CustD | Item001 | 3 |
| 0011 | CustD | Item003 | 1 |
| 0012 | CustC | Item002 | 4 |
| . | . | . | . |

*FIG.5*

INDEX INFORMATION FILE

600

| ITEM ID | RECORD POINTER |
|---------|----------------|
| Item001 | 0x00000000 |
| Item003 | 0x00000100 |
| Item001 | 0x00000200 |
| Item001 | 0x00000300 |
| Item002 | 0x00000400 |

| | |
|---------|----------------|
| Item003 | 0x00000500 |
| Item001 | 0x00000600 |
| Item002 | 0x00000700 |
| Item003 | 0x00000800 |
| Item001 | 0x00000900 |

| | |
|---------|----------------|
| Item003 | 0x00001000 |
| Item004 | 0x00001100 |
| . | . |
| . | . |
| . | . |

*FIG.6*

QUERY 01      ~2800
```
select * from SALES HISTORY TABLE
where ITEM ID = Item001
```

FIG.26A

QUERY 02      ~2801
```
select * from SALES HISTORY TABLE
where ITEM ID = Item002
```

FIG.26B

QUERY 03      ~2802
```
select * from SALES HISTORY TABLE
where ITEM ID = Item003
```

FIG.26C

DATABASE PROCESSING METHOD AND DATABASE PROCESSING SYSTEM

CLAIM OF PRIORITY

The present application claims priority from Japanese patent application JP 2009-116517 filed on May 13, 2009, the content of which is hereby incorporated by reference into this application.

BACKGROUND OF THE INVENTION

This invention relates to a technology of processing data managed by a database using an index.

In recent years, introduction of the radio frequency identification (RFID) has rapidly increased the scale of a database for storing data such as transaction data and traceability data. Further, there has increasingly arisen a need to use such a large-scale database for business analysis and sales analysis and to apply results thereof to business. The data size is expected to exceed 100 terabytes, and be on the scale of petabytes.

Business analysis and sales analysis are conducted from various perspectives, and therefore a database processing system is required to process ad hoc queries for large-size data at high speed. JP 2007-34414 A discloses, to meet the need as described above, a database processing system capable of processing ad hoc queries for large-size data with high efficiency.

In the database processing system disclosed in JP 2007-34414 A, tasks are dynamically generated at the time of execution of a query, and the plurality of generated tasks are executed in parallel to one another. Then, in order to read data stored in a secondary storage system constituted by a plurality of disk devices such as hard disk drives (HDDs) at high speed, the plurality of tasks issue input/output requests (hereinafter, referred to as "I/O requests") respectively.

The I/O requests issued by the tasks are executed in parallel to one another in the plurality of disk devices that constitute the secondary storage system, and hence may be processed in a short time period. Further, the multiply-issued I/O requests are scheduled so that a seek time and a rotational latency can be shortened, in consideration of the location of the head of the HDD and the location of the read request target data in the HDD as well as an issuance order of the I/O requests. Accordingly, the I/O request processing time period can further be shortened.

In addition, "Understanding the LINUX KERNEL, THIRD EDITION" authored by Daniel P. Bovet et al., published by O'Reilly Media, Inc., pp. 560-598 discloses a technology in which a database processing system or an operating system queues a plurality of I/O requests and schedules the queued I/O requests, to shorten an I/O request processing time period. Specifically, the database processing system or the operating system specifies an access destination logical block address (LBA) for each of the plurality of queued I/O requests, and changes an output order so that the seek time and the rotational latency of the HDD can be shortened.

SUMMARY OF THE INVENTION

In the database processing system, in a case of search for specific data from among data stored in a table, an index is created in order to reduce the number of I/O requests issued along with the search processing and to shorten a search time period. However, in a case where a large amount of data is handled, even if an index is used for search, a considerable number of I/O requests are issued.

In order to shorten the I/O request processing time period in a case where I/O requests are queued and scheduled, it is effective to queue all I/O requests necessary for the search processing and to schedule all the queued I/O requests. However, it takes a long time period to queue all the I/O requests, and further takes a considerably long time period to schedule the considerable number of I/O requests.

Meanwhile, instead of scheduling all the I/O requests necessary for the search processing, there is disclosed a technology of scheduling only a part of I/O requests repeatedly. For example, there is a method such that a part of I/O requests are issued from a database processing system and are accumulated in a queue provided by a disk device, then all the accumulated I/O requests are scheduled. However, in this method, only a part of I/O requests are focused as a target of the scheduling processing, and hence the entire I/O request processing time period cannot necessarily be shortened.

This invention has been made in view of the problems described above, and it is therefore an object of this invention to shorten a time period necessary to process I/O requests in a manner in which a database processing system controls an issuance order of the I/O requests.

The representative aspects of this invention are as follows. That is, there is provided a database processing method used in a database processing system having: a computer for outputting data in response to a received query request; and a storage system for storing the data to be output by the computer, the computer having: a first interface coupled to the storage system; a processor coupled to the first interface; and a memory coupled to the processor, the storage system having: a second interface coupled to the computer; a controller coupled to the second interface; and a storage device for storing the data, the storage device storing an index indicating a storage location of the data, the data stored in the storage device being grouped, based on the storage location of the data, into a plurality of data groups, the index comprising including a plurality of partial indices, the plurality of partial indices each indicating the storage location of the data included in one of the plurality of the data groups, the database processing method including the steps of: receiving, by the processor, the query request for the data stored in the storage device; acquiring, by the processor, one of the plurality of partial indices from the index; specifying, by the processor, based on the query request for the data and the acquired one of the plurality of partial indices, a location at which the requested data is stored; and sending, by the processor, a request to acquire the data stored at the specified location to the storage system.

According to the aspect of this invention, the request to acquire the data is sent to the storage system for each of the plurality of partial indices created based on the storage location of the data, and accordingly, a scheduling function provided by the storage system is utilized, to thereby allow a time period necessary to input and output the data to be shortened.

BRIEF DESCRIPTION OF THE DRAWINGS

The present invention can be appreciated by the description which follows in conjunction with the following figures, wherein:

FIG. 4 is a diagram illustrating a mapping table showing a mapping between logical addresses and physical addresses, which is an example of structural information of an external storage system for storage according to the first embodiment of this invention;

FIG. 5 is a diagram illustrating an example of a sales history table used for creating partial indices according to the first embodiment of this invention;

FIG. 6 is a diagram illustrating an example of an index information file according to the first embodiment of this invention;

FIGS. 26A to 26C are diagrams illustrating examples of queries that are simultaneously issued according to the ninth embodiment of this invention;

DETAILED DESCRIPTION OF THE PREFERRED EMBODIMENTS

Hereinbelow, referring to the accompanying drawings, embodiments of this invention are described.

First Embodiment

Figure 1:
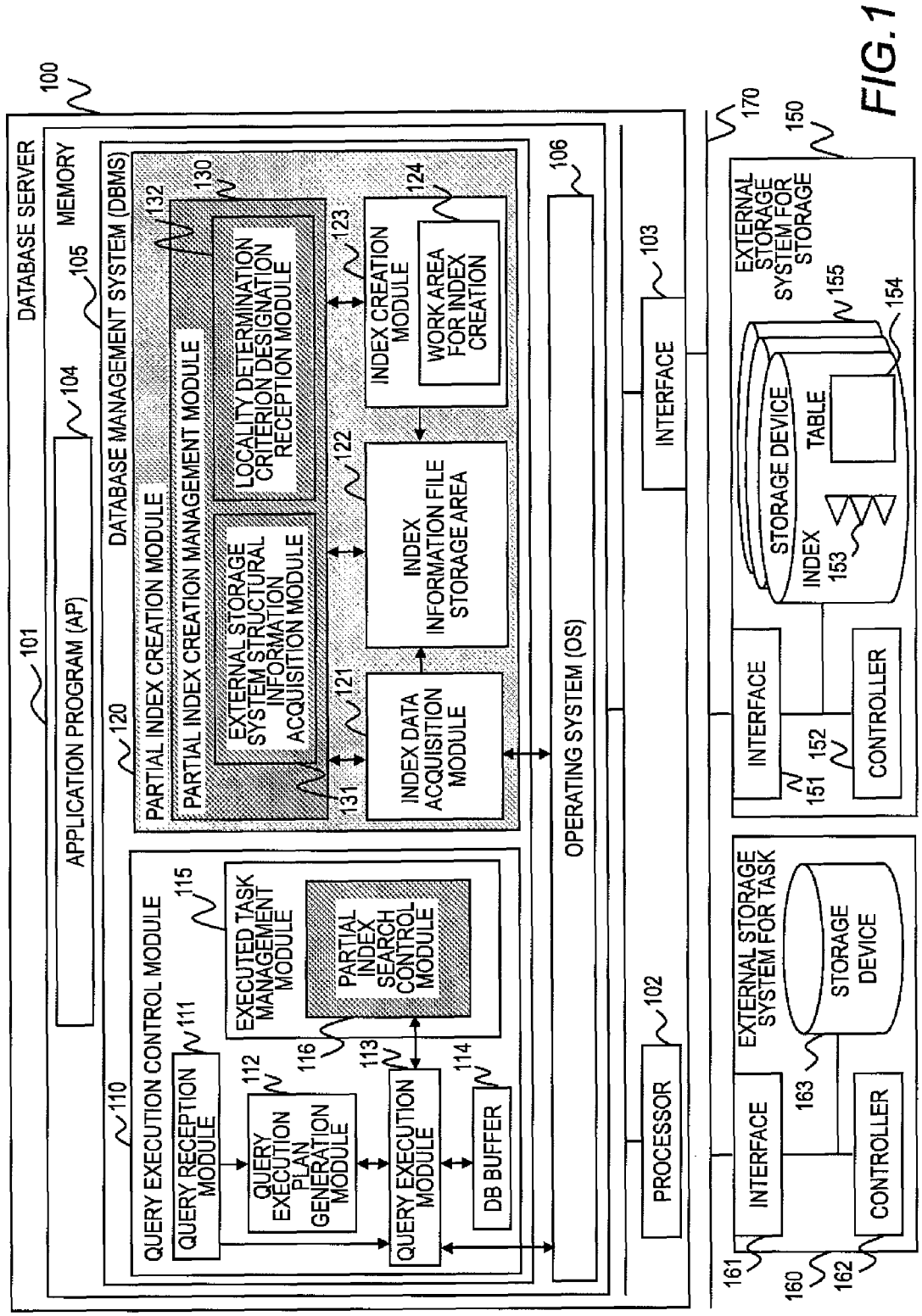
FIG. 1 is a block diagram illustrating a configuration of a computer system according to a first embodiment of this invention.

FIG. 1 is a block diagram illustrating a configuration of a computer system according to a first embodiment of this invention.

The computer system according to the embodiments of this invention includes a database server 100, an external storage system for storage 150, and an external storage system for task 160. A database management system operates in the database server 100. The external storage system for storage 150 stores data managed by the database management system. The external storage system for task 160 temporarily stores data generated in the course of processings performed by the database management system.

The database server 100, the external storage system for storage 150, and the external storage system for task 160 are coupled to one another via a network 170. For example, the network 170 is a storage area network (SAN) to which the fibre channel (FC) protocol is applied, but the network 170 may be any other type of network than the above. For example, the network 170 may be an internet protocol (IP) network, via which the database server 100, the external storage system for storage 150, and the external storage system for task 160 communicate with one another in conformity to the internet small computer system interface (iSCSI) protocol.

The external storage system for storage 150 includes an interface 151, a controller 152, and a storage device 155. The external storage system for storage 150 reads and writes data stored in the storage device 155 in response to an input/output (I/O) request received from the database server 100.

The interface 151 is coupled to the network 170. The controller 152 processes the I/O request sent from the database server 100.

The storage device 155 stores data which is to be read and written by the database server 100. Specifically, the storage device 155 is a hard disk drive (HDD), an optical disk drive, a semiconductor storage device, or other such storage device. Further, the storage device 155 stores a table 154 and an index 153 serving as data to be processed by the database server 100.

It should be noted that FIG. 1 illustrates three storage devices 155, but an arbitrary number of storage devices 155 may be provided in the external storage system for storage 150. Alternatively, a plurality of storage devices 155 may be provided to form a disk array.

In consideration of a location of a read head of the HDD and a storage location of data which is the target of the read request, the external storage system for storage 150 has a function of scheduling I/O requests for data so that a seek time and a rotational latency can be shortened.

Similarly to the external storage system for storage 150, the external storage system for task 160 includes an interface 161, a controller 162, and a storage device 163. Functions of the interface 161 and the controller 162 are the same as those of the interface 151 and the controller 152 of the external storage system for storage 150. The storage device 163 temporarily stores data necessary for processings performed by the database server 100.

The database server 100 includes a memory 101, a processor 102, and an interface 103.

The memory 101 stores programs executed by the processor 102 and data necessary to execute the programs. The programs and data stored in the memory 101 are described later.

The processor 102 executes the programs stored in the memory 101. The interface 103 is an interface for coupling the database server 100 to the network 170. For example, in a case where the network 170 is a storage area network (SAN), a host bus adapter (HBA) is employed as the interface 103.

The memory 101 stores an application program 104, a database management system 105, and an operating system 106. The application program 104 issues a query for data to the database management system 105, and receives a query result therefrom.

The database management system 105 processes a query request for data issued from the application program 104, and sends a query result as a response. Specifically, based on the received query request, the database management system 105 reads and writes the data stored in the external storage system for storage 150 or the external storage system for task 160 via the operating system 106 if necessary.

The operating system 106 receives a request from the database management system 105, and sends, to the external storage system for storage 150 or the external storage system for task 160, a read/write request for the data stored therein. Further, the operating system 106 manages the processor 102 and the memory 101 of the database server 100.

In the first embodiment of this invention, the same computer executes the application program 104 as well as the database management system 105. Alternatively, the application program 104 may be executed by another computer coupled to the database server 100 via the network 170.

The database management system 105 extracts and processes the data stored in the external storage system for storage 150 in response to a given query request, and sends a query result as a response. In a relational database management system (RDBMS), which is based on a relational model, data called "record" is stored in the table 154, and the index 153, which has a data structure for accessing the record with a small number of I/O requests, is provided thereto. A B-tree, a hash, or other data structure is employed as the data structure of the index 153. The query for data is written in the structured query language (SQL).

In the first embodiment of this invention, the database management system 105 stores the table 154 and the index 153 in the external storage system for storage 150 coupled to the database management system 105 via the network 170. Alternatively, the database management system 105 may store the table 154 and the index 153 in a storage device provided in the database server 100.

The database management system 105 includes a query execution control module 110 and a partial index creation module 120. The query execution control module 110 receives a query request issued from the application program 104, and processes the query to send a result thereof as a response. The partial index creation module 120 creates a partial index associated with a group of data pieces having locality, based on storage locations of data pieces. As described later, the locality means that data pieces are stored within a predetermined range of the storage device. The predetermined range may be set based on physical addresses or alternatively on a track or sector basis.

The partial index creation module 120 includes an index data acquisition module 121, an index information file storage area 122, an index creation module 123, and a partial index creation management module 130.

The index data acquisition module 121 acquires data pieces necessary to create an index from a group of records stored in the table. The index information file storage area 122 is an area for storing the acquired data pieces as a file.

The index creation module 123 creates an index based on the data pieces acquired by the index data acquisition module 121 or the like. The index creation module 123 includes a work area for index creation 124 for temporarily holding data generated in the course of index creation.

The partial index creation management module 130 includes an external storage system structural information acquisition module 131 and a locality determination criterion designation reception module 132. The external storage system structural information acquisition module 131 acquires structural information of the external storage system for storage 150 that stores the table 154 and the index 153, and holds the acquired structural information. The locality determination criterion designation reception module 132 receives an input of a locality determination criterion designated by a user.

It should be noted that the locality determination criterion is input by the user in the first embodiment of this invention, but alternatively, may be set automatically based on a system environment such as a capacity of the memory 101. A method of automatically setting the locality determination criterion is described in a fourth embodiment.

It should also be noted that, in a case where the amount of data stored in the index information file storage area 122 and the work area for index creation 124 has exceeded the capacity of the memory 101, the data is temporarily stored in the external storage system for task 160, and is read again to the memory 101 if necessary.

The query execution control module 110 includes a query reception module 111, a query execution plan generation module 112, a query execution module 113, a DB buffer 114, and an executed task management module 115.

The query reception module 111 receives a query request issued from the application program 104.

The query execution plan generation module 112 generates procedures of processing the received query (query execution plan). The query execution plan refers to processing procedures obtained by combining database operations necessary to generate a query result.

The query execution module 113 dynamically generates tasks according to the generated query execution plan, and executes the plurality of tasks thus generated in parallel to one another. The query execution module 113 is provided with basic database operations for generating a query result.

The DB buffer 114 temporarily stores, in order to process queries at high speed, data used in the course of the processing.

The executed task management module 115 manages tasks that have been executed by the query execution module 113. The executed task management module 115 includes a partial index search control module 116. The partial index search control module 116 controls a search processing performed by using partial indices.

As described above, according to the first embodiment of this invention, a plurality of tasks are generated and the generated tasks are executed in parallel to one another, to thereby process query requests at high speed. Further, an I/O request for data is issued independently among the tasks. At this time, storage locations of data pieces which are targets of input and output are controlled so that I/O requests for those data pieces can be issued locally, to thereby utilize the scheduling function provided to the external storage system for storage 150 with more efficiency.

Figure 2A:
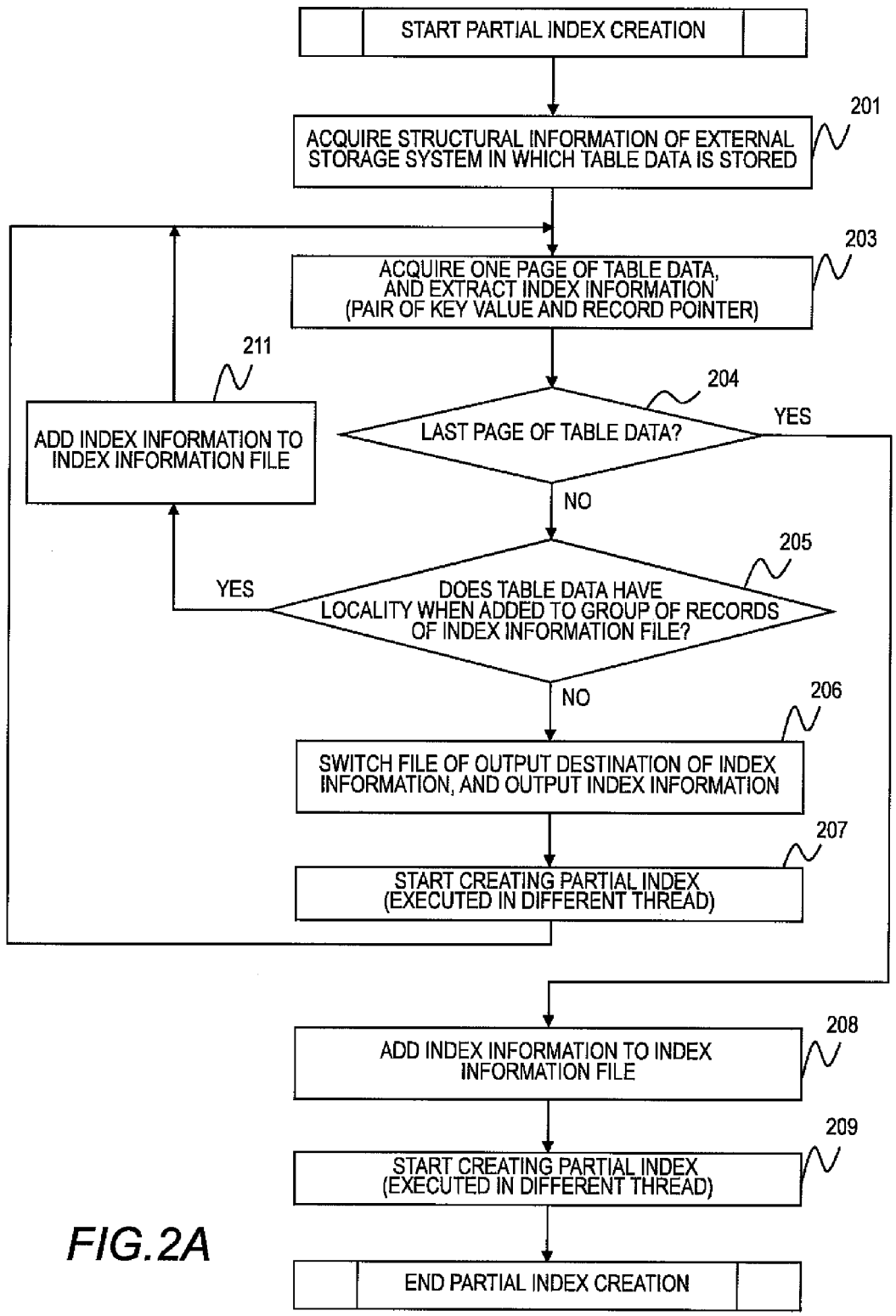
FIG. 2A is a flow chart illustrating procedures of creating an index according to the first embodiment of this invention.
Figure 2B:
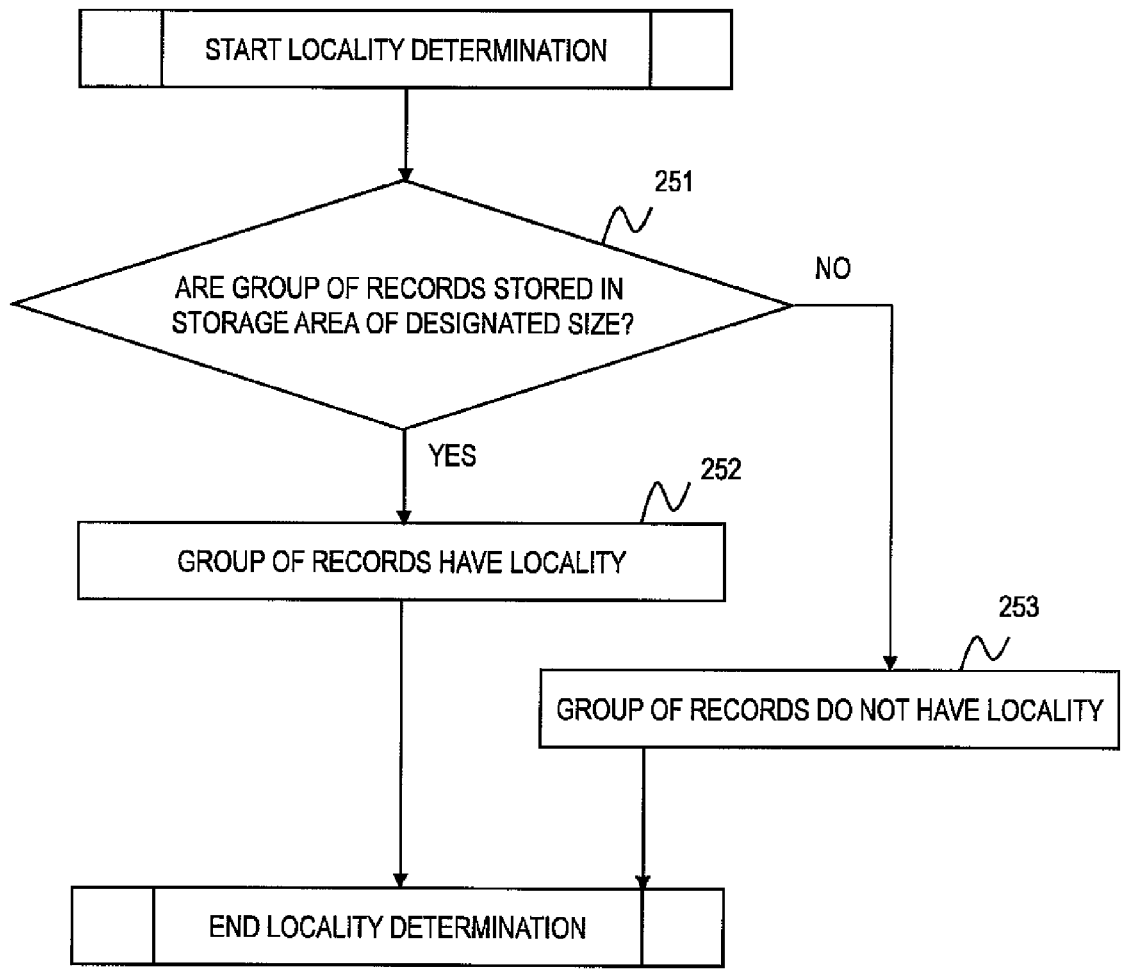
FIG. 2B is a flow chart illustrating procedures of determining locality according to the first embodiment of this invention.
Figure 3:
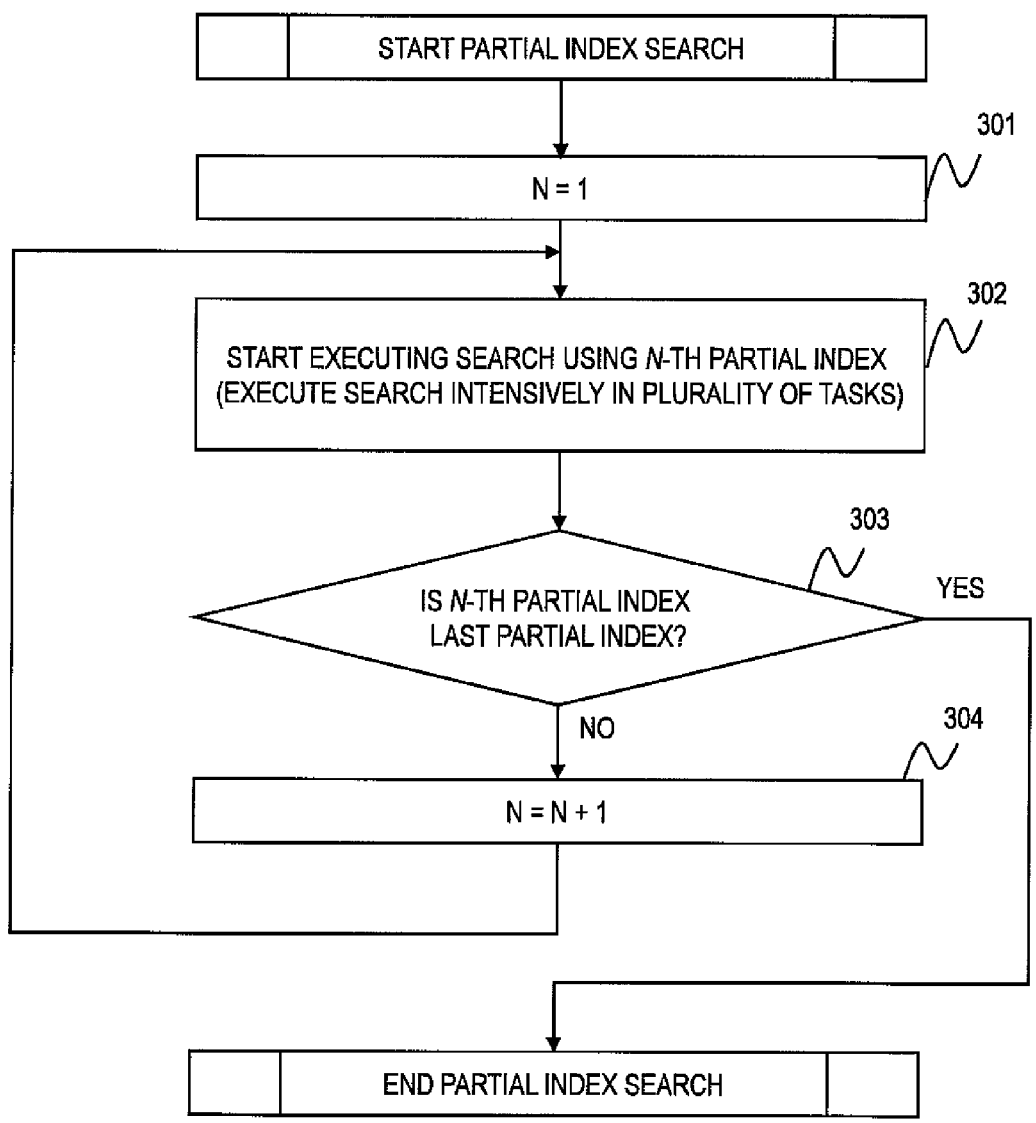
FIG. 3 is a flow chart illustrating procedures for index search according to the first embodiment of this invention.

Hereinbelow, description is given of processing procedures performed by the database management system 105 according to the first embodiment of this invention. FIGS. 2A and 2B illustrate procedures of creating partial indices, and FIG. 3 illustrates search procedures performed by using the partial indices. FIG. 4 illustrates an example of the structural information of the external storage system for storage 150, the structural information being used for determining locality necessary to create partial indices. FIG. 5 illustrates a sales history table 500 as an example of data for describing the procedures of creating partial indices. FIG. 6 illustrates an example of a created index information file 600. First, description is given of the sales history table 500 serving as a source of partial index creation according to the first embodiment of this invention.

FIG. 5 is a diagram illustrating an example of the sales history table 500 used for creating partial indices according to the first embodiment of this invention.

The sales history table 500 is an example of a history of sold items in a shop, and is also an example of the table 154 stored in the external storage system for storage 150. The sales history table 500 contains a sales ID 501, a customer ID 502, an item ID 503, and a quantity 504.

The sales ID 501 is an identifier for identifying a history of a sold item. The customer ID 502 is an identifier of a customer who has purchased the item. The item ID 503 is an identifier of the purchased item. The quantity 504 is a quantity of the purchased item identified by the item ID 503.

Hereinbelow, description is given of the procedures of creating partial indices based on the item ID 503 of the sales history table 500 illustrated in FIG. 5.

FIG. 2A is a flow chart illustrating procedures of creating an index according to the first embodiment of this invention.

This processing is executed by the processor 102 of the database server 100 executing the partial index creation module 120.

First, the processor 102 executes the external storage system structural information acquisition module 131 to acquire the structural information of the external storage system for storage 150 (Step 201). FIG. 4 illustrates an example of the structural information acquired in the processing of Step 201.

FIG. 4 is a diagram illustrating a mapping table 400 showing a mapping between logical addresses and physical addresses, which is an example of the structural information of the external storage system for storage 150 according to the first embodiment of this invention.

In the first embodiment of this invention, the external storage system for storage 150 includes three HDDs each providing a storage area in 1-kilobyte stripes from the head. It should be noted that this invention is not limited to the structure of the storage area described herein, and the storage area only needs to be structured by one or more storage devices.

The mapping table 400 contains a logical address 401 recognized by the database server 100, and a physical address 402 associated with the logical address 401. The physical address 402 contains an HDD number, which is identification information of an HDD, and a cylinder/head/sector (CHS) of the HDD.

The structural information may be acquired from the external storage system for storage 150 by executing the external storage system structural information acquisition module 131, but alternatively, if the external storage system for storage 150 has a management command for outputting the structural information, such a management command as described above may be used for acquiring the structural information. Still alternatively, a database designer who has made settings to the external storage system for storage 150 may create a file containing the mapping table 400 in advance, which may be read by the external storage system structural information acquisition module 131. Further, an administrator may input the structural information to the external storage system structural information acquisition module 131 via a user interface such as a graphical user interface (GUI). Still further, the structural information may be acquired again at an arbitrary timing, to thereby create a mapping table 400 again.

The procedures of creating partial indices illustrated in FIG. 2A are described again.

Subsequently, the processor 102 reads one page of records of the sales history table 500. Then, the processor 102 executes the index data acquisition module 121 to extract index information pieces each formed by a pair of an item ID of the record and a pointer thereto, which are necessary to create an index (Step 203).

It should be noted that the first embodiment of this invention describes the method of creating the index 153 with respect to data that has already been stored in the table 154 of the storage device 155, but the index 153 may be created in parallel to a processing of inserting data to the table 154. In this case, the index information is extracted in parallel to the processing of inserting data to the table 154.

The processor 102 determines whether or not the page thus read is the last page of the sales history table 500 (Step 204). In a case where the page thus read is not the last page of the sales history table 500 (the result of Step 204 is "No"), the processor 102 then determines whether or not the records from which the index information pieces have been extracted have locality in the external storage system for storage 150 with respect to a group of records contained in the index information file 600 (Step 205).

The criterion for determining whether or not the group of records contained in the index information file 600 and the records from which the index information pieces have been extracted have locality is set based on an instruction received from the user through the locality determination criterion designation reception module 132. In the first embodiment of this invention, the records having locality are those stored within a designated range of the area of the storage device 155. In the processing of Step 205, the processor 102 determines whether or not the storage locations of the records from which the index information pieces have been extracted are included in a storage area corresponding to that of the group of records contained in the index information file 600. The processor 102 may determine whether or not the storage area after addition of the records from which the index information pieces have been extracted to the group of records contained in the index information file 600 under creation falls within the designated range.

Specifically, the processor 102 determines the locality by associating, according to the mapping table 400 stored in the external storage system structural information acquisition module 131, logical addresses of the records recognized by the database management system 105 with physical addresses of the storage device 155, respectively. In other words, the processor 102 determines whether or not the records are stored physically close to one another. It should be noted that, as described above, any other criterion than the address may be designated as the locality determination criterion. There is provided, as another example of the locality determination criterion, a movement distance of the head of each HDD falling within a range of a predetermined threshold value or less. Further, the processor 102 may determine the locality based on logical block addressing (LBA) of the storage locations of the records. In this case, the LBA scheme may be employed for the physical address 402 of the mapping table 400.

FIG. 2B is a flow chart illustrating procedures of determining locality according to the first embodiment of this invention.

This processing is executed in the processing of Step 205 of the flow chart illustrated in FIG. 2A.

The processor 102 specifies the storage locations of the records from which the index information pieces have been extracted. Then, based on the mapping table 400 illustrated in FIG. 4, the processor 102 determines whether or not the group of records to which the records from which the index information pieces have been extracted are added are stored in a storage area of a designated size (Step 251).

In a case where the group of records are stored in the storage area of the designated size (the result of Step 251 is "Yes"), the processor 102 determines that the group of records after addition of the index information pieces have locality (Step 252).

On the other hand, in a case where the group of records are not stored in the storage area of the designated size (the result of Step 251 is "No"), the processor 102 determines that the group of records after addition of the index information pieces do not have locality (Step 253).

The procedures of creating partial indices illustrated in FIG. 2A are described again.

In a case where the records from which the index information pieces have been extracted have locality with respect to the group of records contained in the index information file 600 (the result of Step 205 is "Yes"), the processor 102 adds the extracted index information pieces to the index information file 600 (Step 211).

In a case where the group of records contained in the index information file 600 and the records from which the index information pieces have been extracted do not have locality (the result of Step 205 is "No"), the processor 102 newly sets another index information file 600 as an output destination of the index information pieces, and outputs the extracted index information pieces to the another index information file 600 (Step 206).

Further, the processor 102 newly generates a thread for executing index creation, and creates a partial index based on the switched index information file 600 (Step 207). In the first embodiment of this invention, in order to shorten an index creation time period, the processor 102 newly generates a thread for creating a partial index, and executes the processing of creating the index information file 600 and the processing of creating a partial index in parallel to each other. It should be noted that all the processings may be executed in one thread in turn.

When the processor 102 has finished the processing of Step 207, the processor 102 executes the processings of Step 203 and subsequent steps with respect to the subsequent records.

In a case where the page thus read is the last page of the sales history table 500 (the result of Step 204 is "Yes"), the processor 102 adds the extracted index information pieces to the index information file 600 (Step 208). Further, the processor 102 executes the processing of creating a partial index in another thread than that for the processing of extracting the index information (Step 209).

Through the processings described above, the index information file having locality and the partial index associated therewith are created. FIG. 6 illustrates an example of the index information file in which index information pieces of records having locality are stored.

FIG. 6 is a diagram illustrating an example of the index information file 600 according to the first embodiment of this invention.

As the index information file 600, FIG. 6 illustrates three files created for each group of records having locality. In the first embodiment of this invention, as described above, the index information file 600 is created in association with the group of records, in which records stored within a predetermined range of the storage area have locality. Further, each of the index information files 600 is created so that index information to be stored therein is not the same as index information stored in another index information file 600.

Further description is given of a relation between the created partial indices and the sales history table 500, which is a source of the partial index creation.

Figure 7:
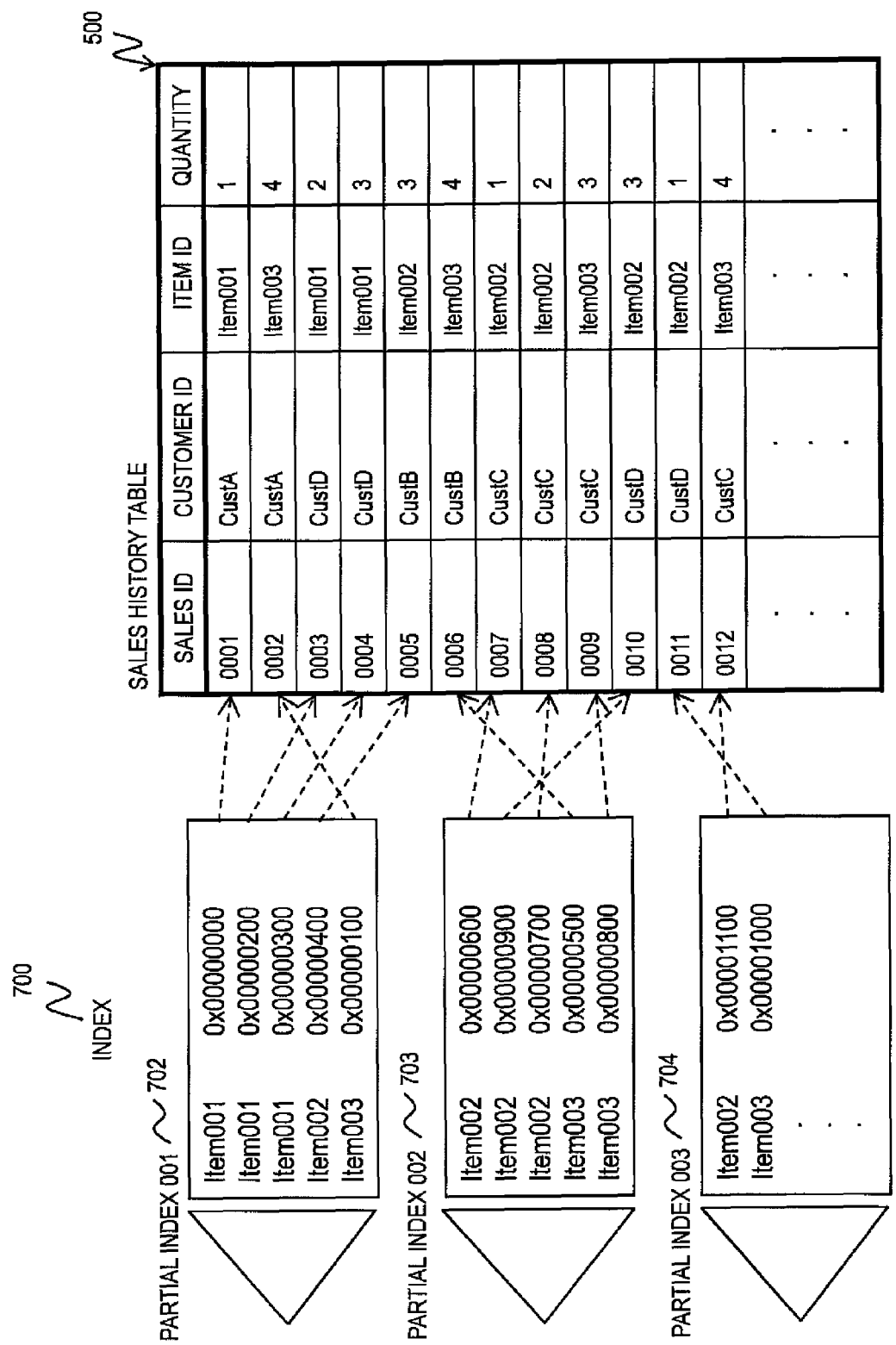
FIG. 7 is an explanatory diagram illustrating a relation between an index and the sales history table according to the first embodiment of this invention.

FIG. 7 is an explanatory diagram illustrating a relation between an index 700 and the sales history table 500 according to the first embodiment of this invention.

In the first embodiment of this invention, the three index information files 600 illustrated in FIG. 6 are created through the procedures illustrated in FIGS. 2A and 2B, and the index 700 containing partial indices 001 to 003 (702 to 704) associated with the three index information files 600, respectively, is created. As described above, the partial indices 001 to 003 (702 to 704) are created so as not to contain the same record thereamong. Further, in each partial index, records to be stored are sorted by items, which base the index (item IDs).

Lastly, description is given of procedures for the search processing performed by using the index 700 containing a plurality of partial indices.

As described above, the search processing is executed by the processor 102 executing the query execution control module 110.

As described above, the processor 102 dynamically generates a plurality of tasks upon the execution of the search processing. The generated tasks are managed by the executed task management module 115. I/O requests are issued multiply in the generated tasks, respectively, from the database server 100 to the external storage system for storage 150. On the above-mentioned premise, referring to FIG. 3, description is given below of procedures for search performed by using the index 700.

FIG. 3 is a flow chart illustrating procedures for index search according to the first embodiment of this invention.

First, the processor 102 initializes a value N of a counter that indicates a partial index to be used for search. Specifically, the processor 102 sets the value N of the counter to "1" (Step 301).

Subsequently, the processor 102 uses the partial index search control module 116 to execute search using an N-th partial index contained in the index 700 (Step 302). At this time, a plurality of tasks of acquiring data associated with the N-th partial index are generated and executed for the search intensively in parallel to one another.

When the processor 102 has finished the search using the N-th partial index, the processor 102 determines whether or not the N-th partial index is the last partial index (Step 303). In a case where the N-th partial index is the last partial index (the result of Step 303 is "Yes"), the processor 102 ends the search processing.

On the other hand, in a case where the N-th partial index is not the last partial index (the result of Step 303 is "No"), the processor 102 updates the value N of the counter to "N+1" (Step 304), and executes the search using an (N+1)th partial index in a similar manner to the above.

As described above, according to the first embodiment of this invention, upon the execution of the search using each partial index associated with the group of records having locality, I/O requests for data pieces stored at local locations of the storage device are issued intensively. Accordingly, an I/O request processing time period can be shortened owing to the function of scheduling I/O requests, which is provided to the external storage system for storage 150.

Further, according to the first embodiment of this invention, the index can be created on a partial index basis in a parallel manner, and accordingly the index creation time period can also be shortened.

Second Embodiment

In the first embodiment of this invention, data pieces of the table 154 are stored in a contiguous storage area. In a second embodiment, in contrast, description is given of a case where data pieces of the table 154 are not stored in the contiguous storage area.

It should be noted that differences from the first embodiment are mainly described in the second embodiment and subsequent embodiments, and components and processings common to those of the first embodiment are denoted by the same reference symbols, to thereby omit description thereof.

Figure 8:
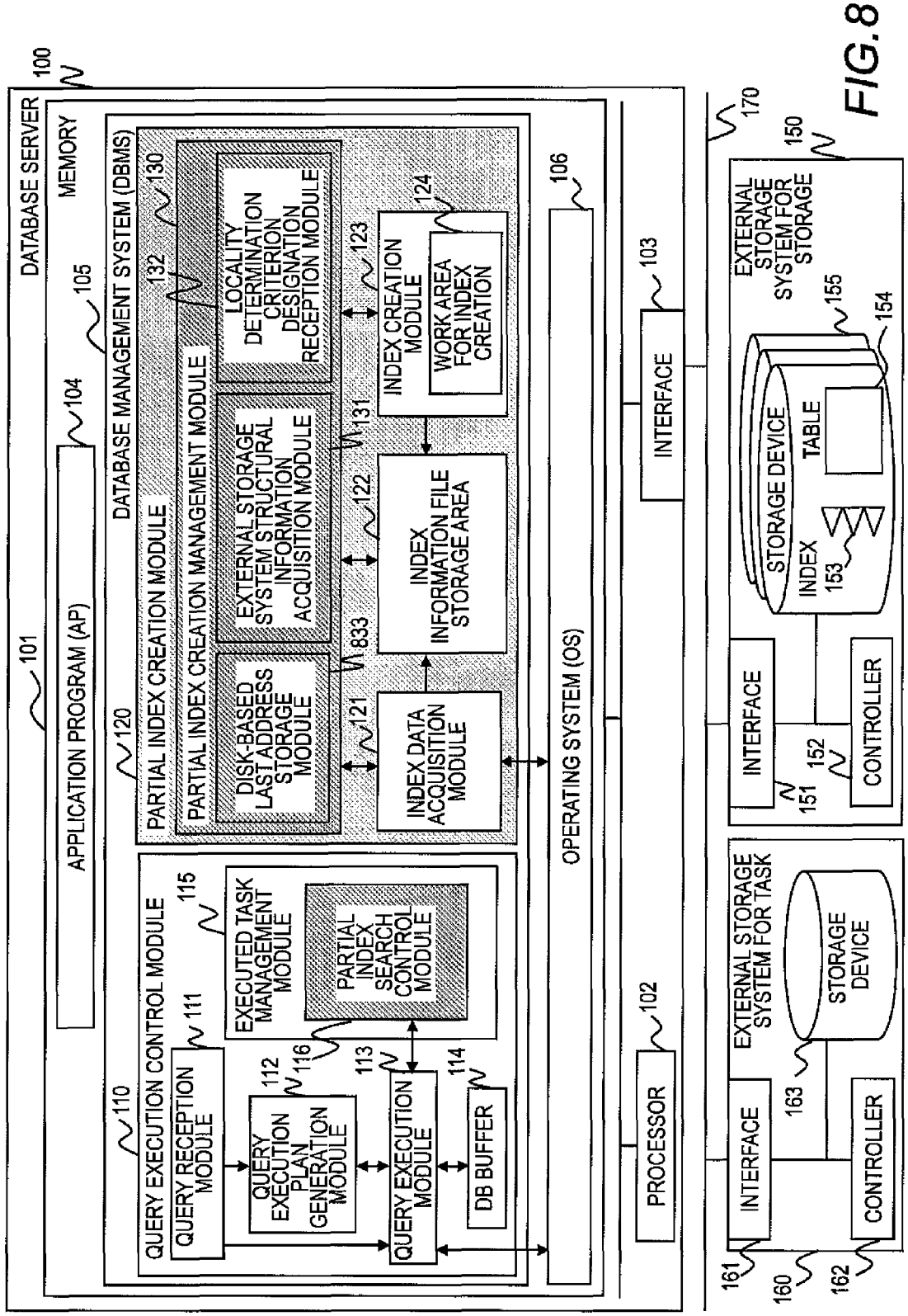
FIG. 8 is a block diagram illustrating a configuration of a computer system according to a second embodiment of this invention.

FIG. 8 is a block diagram illustrating a configuration of a computer system according to the second embodiment of this invention.

The second embodiment of this invention is different from the first embodiment in the partial index creation module 120. Specifically, the partial index creation module 120 according to the second embodiment includes a disk-based last address storage module 833 in addition to the components of the first embodiment.

The disk-based last address storage module 833 stores, on an HDD basis, the last address of a record which is written to the index information file 600 and is associated with the index thereof. The disk-based last address storage module 833 includes a disk-based last address storage table 1100 that holds an address of data that has been read last on an HDD basis. The disk-based last address storage table 1100 is described later in detail referring to FIG. 11.

Figure 9A:
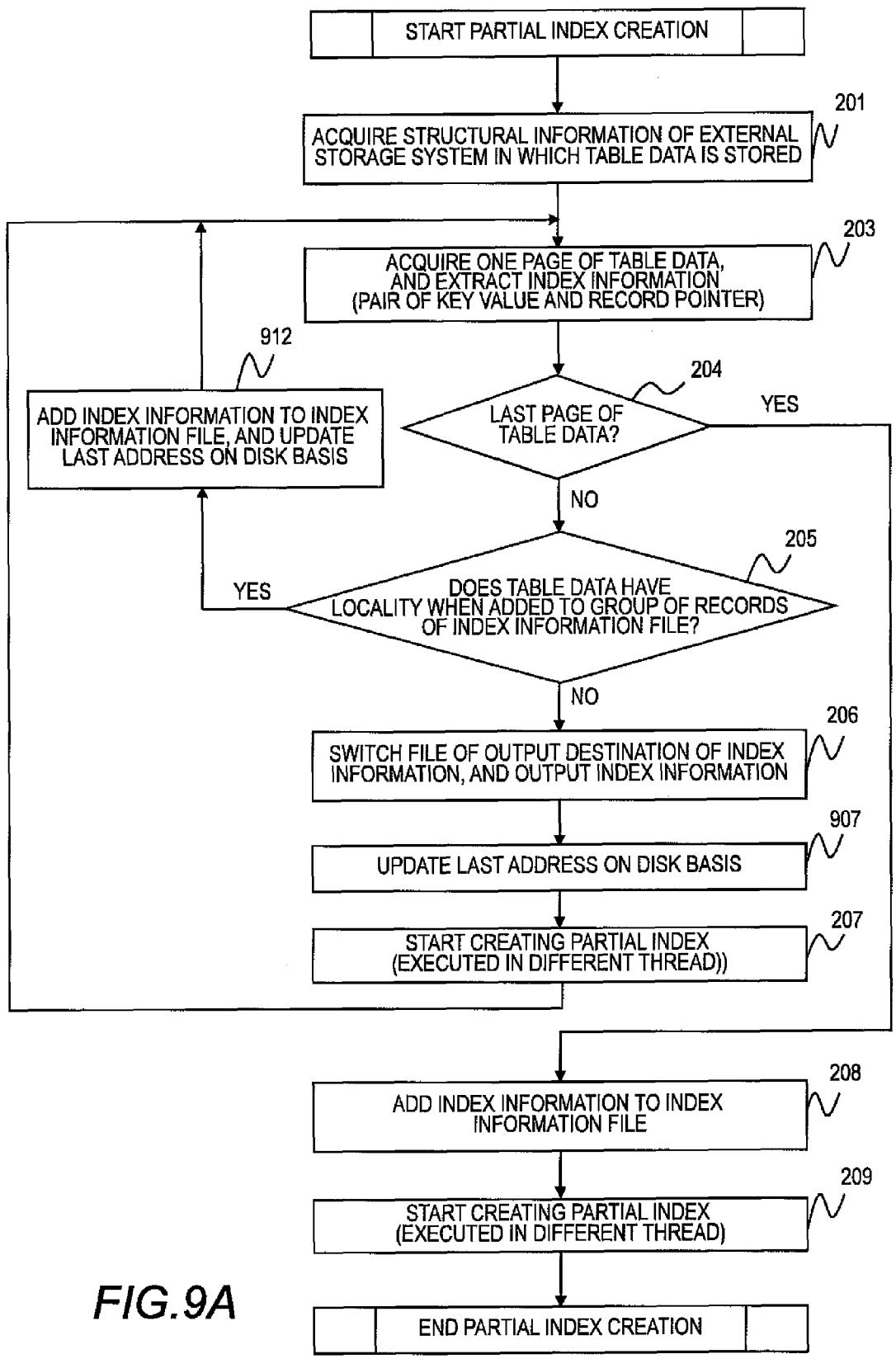
FIG. 9A is a flow chart illustrating procedures of creating an index according to the second embodiment of this invention.
Figure 9B:
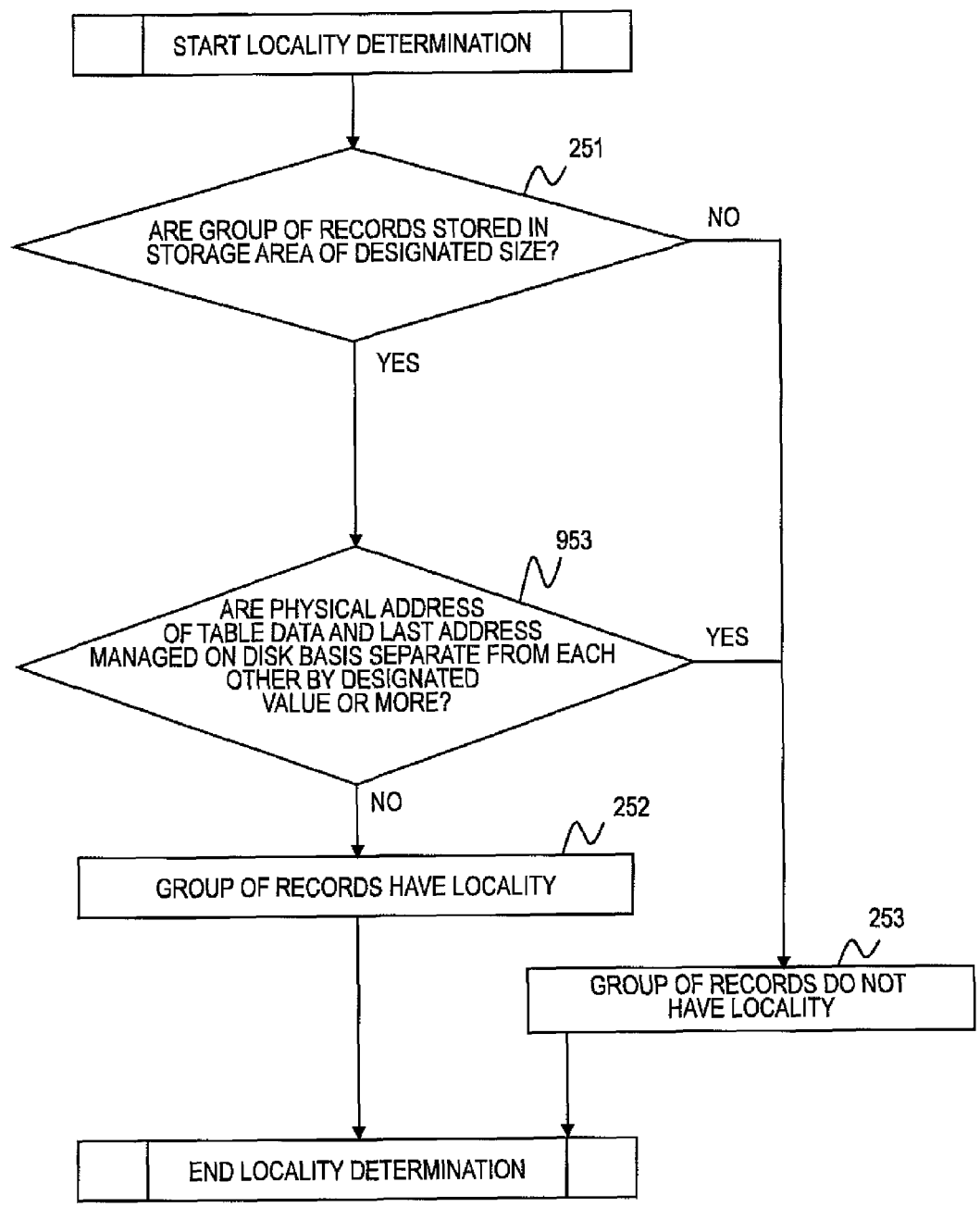
FIG. 9B is a flow chart illustrating procedures of determining locality according to the second embodiment of this invention.

Other components of the second embodiment are similar to those of the first embodiment, and the second embodiment is different from the first embodiment in procedures of creating an index and procedures of determining locality. Referring to FIGS. 9A and 9B, the respective procedures are described.

FIG. 9A is a flow chart illustrating procedures of creating an index according to the second embodiment of this invention.

This processing is executed by the processor 102 of the database server 100 executing the partial index creation module 120.

Figure 10:
FIG. 10 is a diagram illustrating a mapping table showing a mapping between logical addresses and physical addresses, which is an example of structural information of an external storage system for storage according to the second embodiment of this invention.

Similarly to the first embodiment, the processor 102 first executes the external storage system structural information acquisition module 131 to acquire the structural information of the external storage system for storage 150 (Step 201). FIG. 10 illustrates the structural information acquired in the processing of Step 201.

FIG. 10 is a diagram illustrating a mapping table 1000 showing a mapping between logical addresses and physical addresses, which is an example of the structural information of the external storage system for storage 150 according to the second embodiment of this invention. The mapping table 1000 has the same structure as the mapping table 400 of the first embodiment.

In the second embodiment of this invention, similarly to the first embodiment, the external storage system for storage 150 includes three HDDs. However, unlike the first embodiment, records are not always stored in a contiguous storage area. Referring to FIG. 10, in an HDD having an HDD number "01", records are stored in an area including addresses "000000 to 0000ff", and subsequently, stored in an area including addresses "005000 to 0050ff".

The procedures of creating partial indices illustrated in FIG. 9A are described again.

Subsequently, similarly to the first embodiment, the processor 102 reads one page of records of the sales history table 500. Then, the processor 102 executes the index data acquisition module 121 to extract index information pieces each formed by a pair of an item ID of each of the records and an address thereof, which are necessary to create an index (Step 203).

The processor 102 determines whether or not the page thus read is the last page of the sales history table 500 (Step 204). In a case where the page thus read is not the last page of the sales history table 500 (the result of Step 204 is "No"), the processor 102 then determines whether or not the records from which the index information pieces have been extracted have locality in the external storage system for storage 150 with respect to the group of records contained in the index information file 600 (Step 205).

In the second embodiment of this invention, in addition to the criterion that the group of records are stored in an area of the storage device 155 within the designated range, there is further provided a criterion that storage locations of adjacent records are not separate from each other by a designated value or more to determine that the group of records have locality.

FIG. 9B is a flow chart illustrating procedures of determining locality according to the second embodiment of this invention.

The processor 102 specifies the storage locations of the records from which the index information pieces have been extracted. Then, the processor 102 determines whether or not the group of records to which the records from which the index information pieces have been extracted are added are stored in a storage area of a designated size (Step 251).

Figure 11:
FIG. 11 is a diagram illustrating an example of a disk-based last address storage table according to the second embodiment of this invention.

In a case where the group of records are stored in the storage area of the designated size (the result of Step 251 is "Yes"), the processor 102 further determines whether the physical address of each table data and the last address managed on a disk basis are separate from each other by a designated value or more (Step 953). FIG. 11 illustrates an example of the disk-based last address storage table 1100 that stores the last address managed on a disk basis.

FIG. 11 is a diagram illustrating an example of the disk-based last address storage table 1100 according to the second embodiment of this invention.

In the disk-based last address storage table 1100, an address of a record that has been read last is stored on an HDD basis. The disk-based last address storage table 1100 contains an HDD number 1101 for identifying an HDD, and a last address 1102 in which an address associated with a record that has been read last is stored.

In a case where the physical address of each table data and the last address managed on a disk basis are not separate from each other by the designated value or more (the result of Step 953 is "No"), the processor 102 determines that the group of records after addition of the index information pieces have locality (Step 252).

On the other hand, in a case where the group of records are not stored in the storage area of the designated size (the result of Step 251 is "No"), or in a case where the physical address of each table data and the last address managed on a disk basis are separate from each other by the designated value or more (the result of Step 953 is "Yes"), the processor 102 determines that the group of records after addition of the index information pieces do not have locality (Step 253).

The procedures of creating partial indices illustrated in FIG. 9A are described again.

In a case where the records from which the index information pieces have been extracted have locality with respect to the group of records contained in the index information file 600 (the result of Step 205 is "Yes"), the processor 102 adds the extracted index information pieces to the index information file 600. Further, the processor 102 acquires, based on a logical address of a record associated with an index of the index information file 600 to which the record is to be added, a physical address on the HDD according to the mapping table 1000 illustrated in FIG. 10, and updates the disk-based last address storage table 1100 (Step 912).

In a case where the group of records contained in the index information file 600 and the records from which the index information pieces have been extracted do not have locality (the result of Step 205 is "No"), the processor 102 newly sets another index information file 600 as an output destination of the index information pieces, and outputs the extracted index information pieces to the another index information file 600 (Step 206).

The processor 102 acquires, based on a logical address of a record associated with an index of the index information file 600 to which the record is to be added, a physical address on the HDD according to the mapping table 1000 illustrated in FIG. 10, and updates the disk-based last address storage table 1100 (Step 907). Subsequently, the processor 102 newly generates a thread for executing index creation, and creates a partial index based on the switched index information file 600 (Step 207).

When the processor 102 has finished the processing of Step 207, the processor 102 executes the processings of Step 203 and subsequent steps with respect to the subsequent records.

In a case where the page thus read is the last page of the sales history table 500 (the result of Step 204 is "Yes"), the processor 102 adds the extracted index information pieces to the index information file 600 (Step 208). Further, the processor 102 executes the processing of creating a partial index in another thread than that for the processing of extracting the index information (Step 209).

According to the second embodiment of this invention, in the case where the storage area of the HDD that stores the table is not contiguous as in the case of the addresses "000000 to 0000ff" and "005000 to 0050ff" illustrated in FIG. 10, the boundary therebetween may trigger creation of another partial index. Accordingly, even in the case where table data pieces are not stored in the contiguous storage area, the effect similar to that of the first embodiment can be obtained, and the I/O request processing time period can be shortened owing to the function of scheduling I/O requests, which is provided to the external storage system for storage 150.

Third Embodiment

In a third embodiment of this invention, in addition to the criterion regarding the structural information of the external storage system for storage 150, there is further provided a criterion that the processing of creating a partial index can be executed on the memory of the computer to determine locality. With this configuration, the external storage system for task 160 does not need to be accessed at the time of index creation, and accordingly, the index creation time period can be shortened.

A computer system according to the third embodiment of this invention has a configuration obtained by excluding the external storage system for task 160 from the configuration of the computer system according to the first embodiment. It should be noted that it is at the time of index creation that the external storage system for task 160 is unnecessary. Hence, in a case where the external storage system for task 160 is assumed to be necessary at the time of search execution or other such processing, the same configuration as that of the computer system according to the first embodiment may be employed as the configuration of the computer system according to the third embodiment.

The third embodiment is basically the same as the first embodiment in procedures of creating an index, and is different from the first embodiment in procedures of determining locality. Description is given below of the processing of determining locality while simply describing the procedures of creating an index.

The procedures of creating an index according to the third embodiment of this invention are similar to those of the first embodiment. Therefore, referring to the flow chart illustrated in FIG. 2A, which shows the procedures of creating an index according to the first embodiment, the procedures of creating an index according to the third embodiment are described.

First, the processor 102 uses the external storage system structural information acquisition module 131 to acquire the structural information of the external storage system for storage 150 (Step 201). Then, the processor 102 reads one page of records of the sales history table 500, and extracts index information pieces (Step 203).

Figure 12:
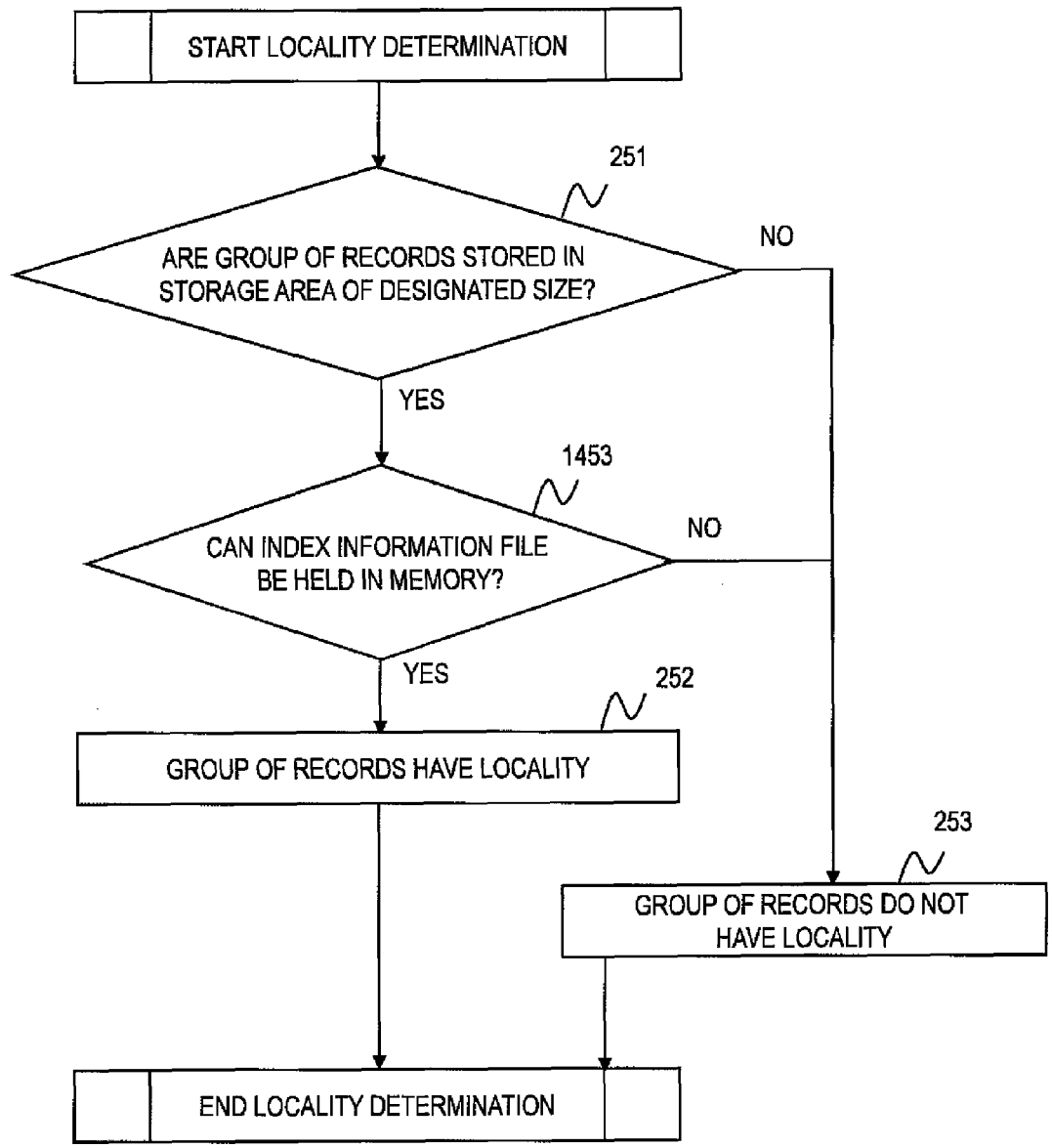
FIG. 12 is a flow chart illustrating procedures of determining locality according to a third embodiment of this invention.

The processor 102 determines whether or not the page thus read is the last page of the sales history table 500 (Step 204). In a case where the page thus read is not the last page of the sales history table 500 (the result of Step 204 is "No"), the processor 102 then determines whether or not the records from which the index information pieces have been extracted have locality (Step 205). Referring to FIG. 12, the procedures of determining locality are described below.

FIG. 12 is a flow chart illustrating procedures of determining locality according to the third embodiment of this invention.

The processor 102 specifies the storage locations of the records from which the index information pieces have been extracted. Then, the processor 102 determines whether or not the group of records to which the records from which the index information pieces have been extracted are added are stored in a storage area of a designated size (Step 251).

In a large-scale database system, when an extremely large number of records are stored in the table 154, there is a risk that the size of the index information file 600 that holds index information becomes larger than the size of the index information file storage area 122.

In this case, in the first embodiment, data that has overflowed is appropriately stored in the external storage system for task 160. However, as compared with the case where access is made only to data stored in the memory to execute processings, a longer processing time period is required in the case where access is made to data stored in the external storage system to execute processings. Therefore, in the third embodiment, it is determined that the group of records do not have locality at the time when the index information file 600 can no longer be stored in the index information file storage area 122.

In a case where the group of records are stored in the storage area of the designated size (the result of Step 251 is "Yes"), the processor 102 further determines whether or not the index information file 600 can be stored in the memory 101 (Step 1453). In other words, the processor 102 determines whether or not the size of the index information file 600 is smaller than the size of the index information file storage area 122. In a case where the index information file 600 can be stored in the memory 101 (the result of Step 1453 is "Yes"), the processor 102 determines that the group of records after addition of the records from which the index information pieces have been extracted have locality (Step 252).

On the other hand, in a case where the group of records are not stored in the storage area of the designated size (the result of Step 251 is "No"), or in a case where an index information piece is newly added to the index information file 600 and hence the size of the index information file 600 so increases that the index information file 600 cannot be held in the memory 101 (the result of Step 1453 is "No"), the processor 102 determines that the group of records after addition of the index information pieces do not have locality (Step 253).

The procedures of creating partial indices illustrated in FIG. 2A are described again.

In a case where the records from which the index information pieces have been extracted have locality (the result of Step 205 is "Yes"), the processor 102 adds the extracted index information pieces to the index information file 600 (Step 211).

On the other hand, in a case where the records from which the index information pieces have been extracted do not have locality (the result of Step 205 is "No"), the processor 102 newly sets another index information file 600 as an output destination of the index information pieces, and outputs the extracted index information pieces to the another index information file 600 (Step 206). After that, the processor 102 newly generates a thread for creating a partial index, and creates a partial index based on the switched index information file 600 (Step 207).

When the processor 102 has finished the processing of Step 207, the processor 102 executes the processings of Step 203 and subsequent steps with respect to the subsequent records.

In a case where the page thus read is the last page of the sales history table 500 (the result of Step 204 is "Yes"), the processor 102 adds the extracted index information pieces to the index information file 600 (Step 208). Further, the processor 102 creates a partial index in another thread than that for the processing of extracting the index information (Step 209).

By creating partial indices through the procedures described above, there is no need to store, in the external storage system for task 160, data that has exceeded the capacity of the memory 101. In this manner, access to the external storage system is no longer necessary, and accordingly, the time period necessary to create partial indices can be shortened.

The processing of creating an index includes a processing of sorting data pieces contained in the index information file 600 in an order of key values. In executing the sorting processing, the data pieces need to be stored in the memory 101 temporarily. In this case, if the memory 101 is short in capacity thereof, there arises a need to input and output data to and from the external storage system for task 160 in order to execute the sorting processing. Therefore, the size of the index information file 600 used for determining locality is set in consideration of the size of the temporary data to be output.

According to the third embodiment of this invention, the index information file 600 can be stored in the memory 101, and hence partial indices can be created without inputting and outputting data to and from the external storage system for task 160. In other words, the size of the index information file 600 is set so that partial indices can be created on memory, to thereby reduce overhead due to the input and output of data to and from the external storage system for task 160, and to shorten the time period necessary to create an index.

Fourth Embodiment

In the first to third embodiments of this invention, the locality determination criterion of the group of records is set by the user's designation. In a fourth embodiment, the locality determination criterion of the group of records is automatically decided by the database management system 105 based on a system environment and the like.

In the fourth embodiment of this invention, the partial index creation management module 130 of the first embodiment includes a locality determination criterion creation module instead of the locality determination criterion designation reception module 132.

The locality determination criterion creation module references the structural information of the external storage system for storage 150, load information of the network 170 and the interface 103, information that may be acquired by the operating system 106, and the like, to thereby generate a locality determination criterion. Based on the created criterion, partial indices are created in a similar manner to the procedures described in the first embodiment.

Examples of the method of generating a locality determination criterion includes deciding a locality determination criterion based on a size of the striped storage area.

Alternatively, the size of the storage area, with which access to the external storage system for task 160 is unnecessary when creating the index information file 600, is acquired, and the size may be set as a locality determination criterion. In this case, the acquired size may be calculated based on an available memory capacity that is acquired from the operating system 106 or the like, and may be set as a size of the index information file storage area 122. By setting the acquired size as a size of the storage area in which the group of records are stored, the effect similar to that of the third embodiment of this invention can be obtained.

Further, based on the mapping table showing the mapping between the logical addresses and the physical addresses, it is determined whether or not the storage areas having the same HDD number are contiguous. In a case where the storage areas are not contiguous, the interval between the storage areas in terms of the physical addresses is acquired. Based on the acquired interval between the storage areas, by, for example, setting the value designated in the processing of Step 953 of the second embodiment, which is illustrated in FIG. 9B, the effect similar to that of the second embodiment can be obtained.

According to the fourth embodiment of this invention, the locality determination criterion can automatically be set without the user's designation. Accordingly, the load on the user is reduced, and moreover, when the system environment is changed as in the case of extension of the external storage system over a long-term operation, a locality determination criterion adapted to such a change in system environment can be applied.

Fifth Embodiment

In a fifth embodiment of this invention, description is given of a method of executing the index search in a case where data pieces of the table 154 are divided to be stored in a plurality of storage devices.

Figure 13:
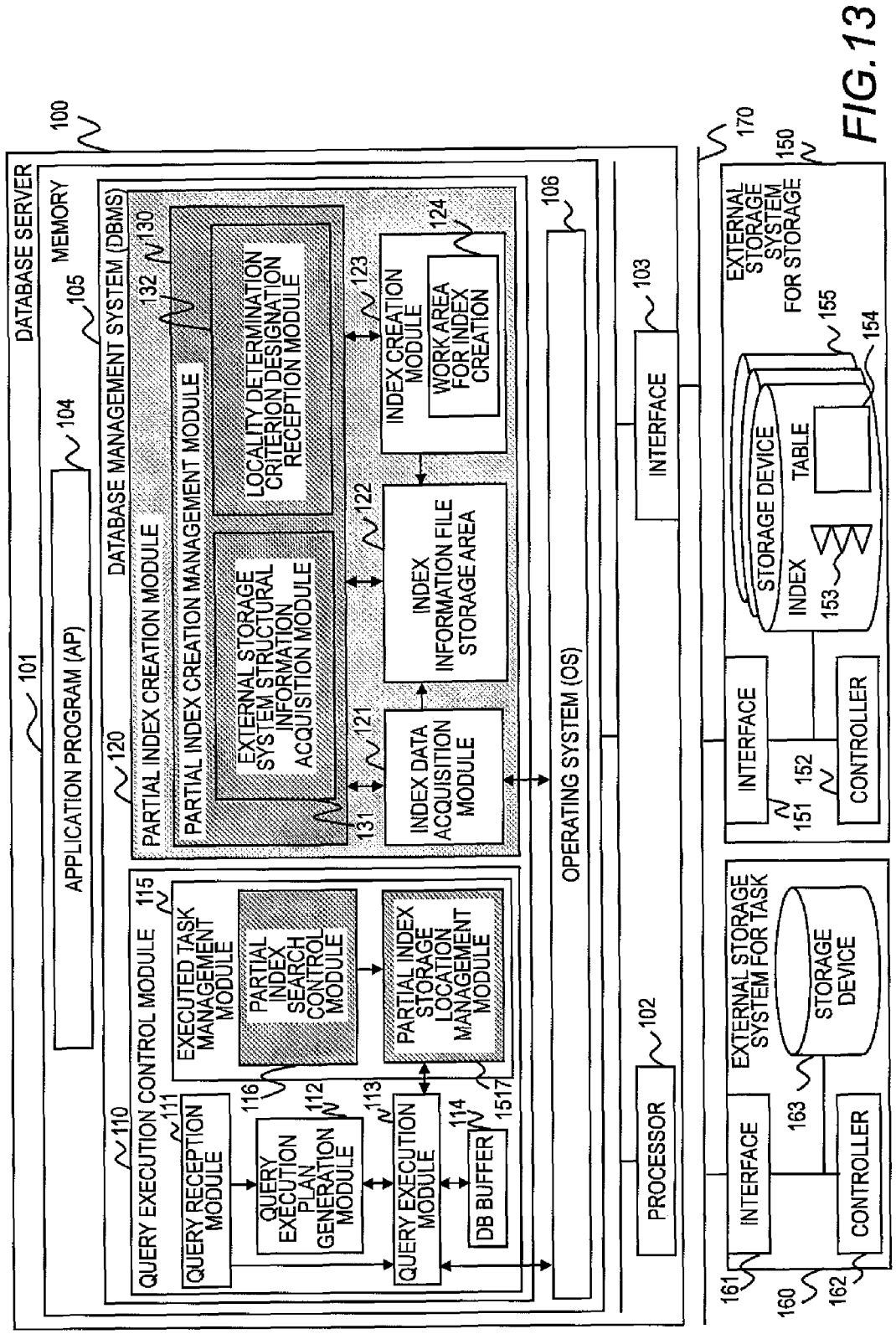
FIG. 13 is a block diagram illustrating a configuration of a computer system according to a fifth embodiment of this invention.

FIG. 13 is a block diagram illustrating a configuration of a computer system according to the fifth embodiment of this invention.

In the fifth embodiment of this invention, the executed task management module 115 according to the first embodiment includes a partial index storage location management module 1517. Other components of the fifth embodiment are similar to those of the first embodiment.

The partial index storage location management module 1517 includes a partial index storage location management table 1900 that holds numbers of the storage devices 155 that store the group of records contained in each partial index. The partial index storage location management module 1517 creates and updates the partial index storage location management table 1900, for example. The partial index storage location management table 1900 is described later in detail referring to FIG. 17.

A mapping table according to the fifth embodiment of this invention has the same structure as the mapping table 400 according to the first embodiment. As illustrated in FIG. 4, data pieces of the table 154 are stored across the three HDDs.

Figure 14:
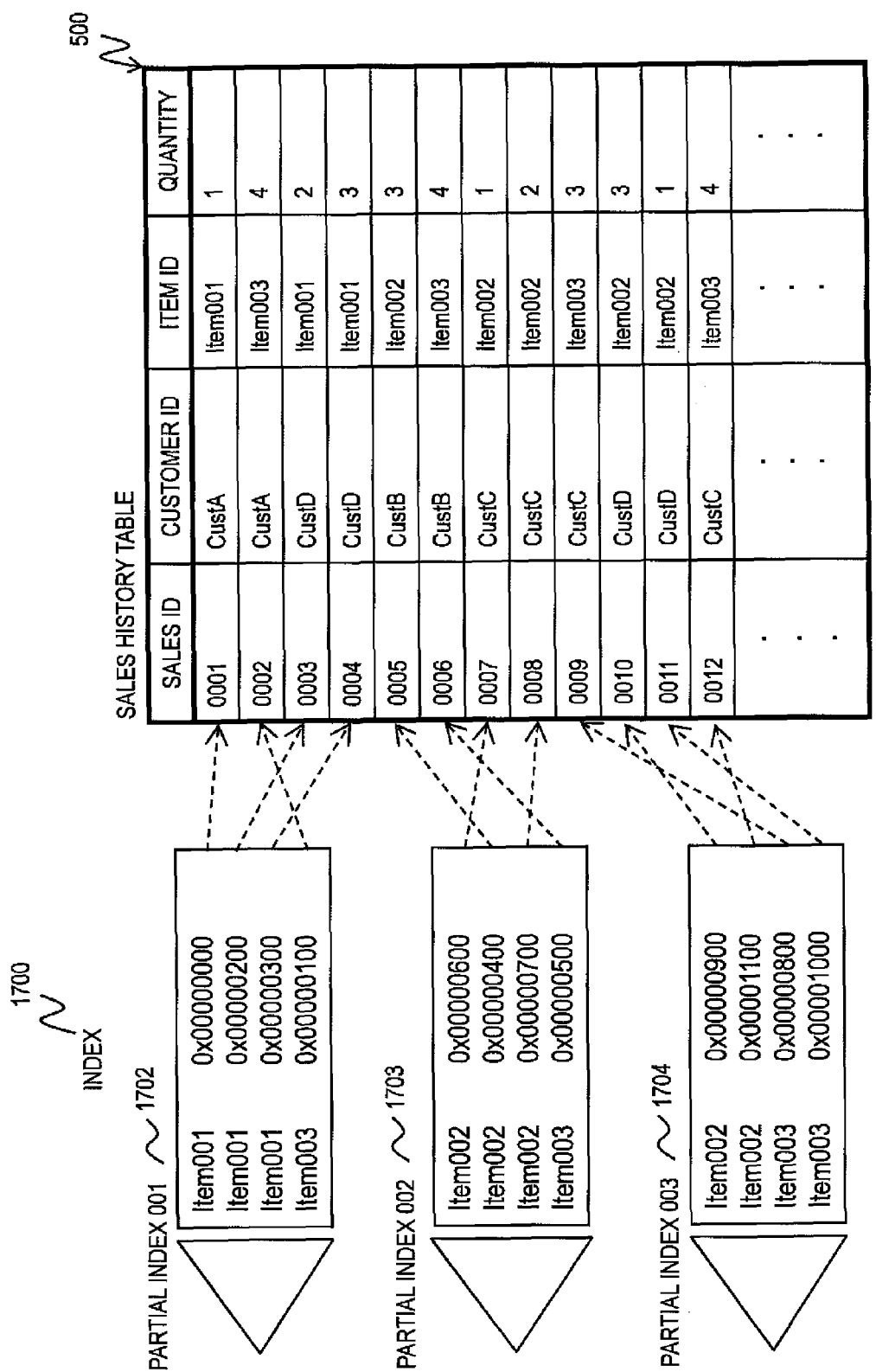
FIG. 14 is an explanatory diagram illustrating a relation between an index and a sales history table according to the fifth embodiment of this invention.

FIG. 14 is an explanatory diagram illustrating a relation between an index 1700 and the sales history table 500 according to the fifth embodiment of this invention.

Referring to FIG. 4, a storage area including logical addresses "0x00000000" to "0x00000fff" is provided by a storage device 155 having an HDD number "01", and a storage area including logical addresses "0x00001000" to "0x00001fff" is provided by a storage device 155 having an HDD number "02". Hence, data pieces corresponding to records associated with a partial index 003 are stored in the storage devices 155 having the HDD numbers "01" and "02".

Figures 16, 17:
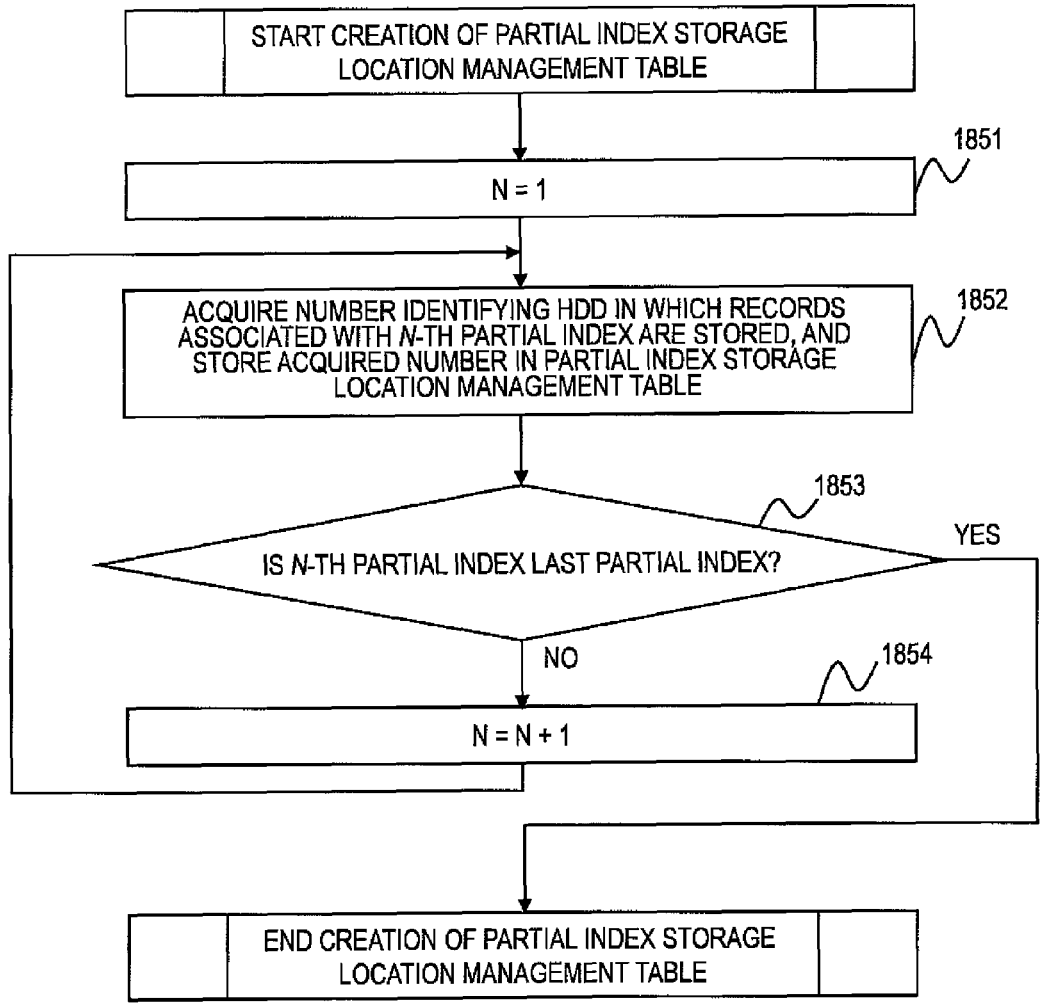
FIG. 16 is a flow chart illustrating procedures of creating a partial index storage location management table according to the fifth embodiment of this invention.
FIG. 17 is a diagram illustrating an example of a partial index storage location management table held by a partial index storage location management module according to the fifth embodiment of this invention.

FIG. 17 is a diagram illustrating an example of the partial index storage location management table 1900 held by the partial index storage location management module 1517 according to the fifth embodiment of this invention.

The partial index storage location management table 1900 shows a mapping between the partial index and the HDD, and holds an identifier of the HDD that stores the partial index. The partial index storage location management table 1900 contains a partial index number 1901 and an HDD number 1902. The partial index number 1901 is a number for identifying a partial index. The HDD number 1902 is a number for identifying an HDD.

In the fifth embodiment of this invention, upon execution of a query, the query execution control module 110 is used to dynamically generate a plurality of tasks. The generated tasks are managed by the executed task management module 115. Then, I/O requests are issued multiply in the tasks, respectively, from the database server 100 to the external storage system for storage 150.

Figure 15:
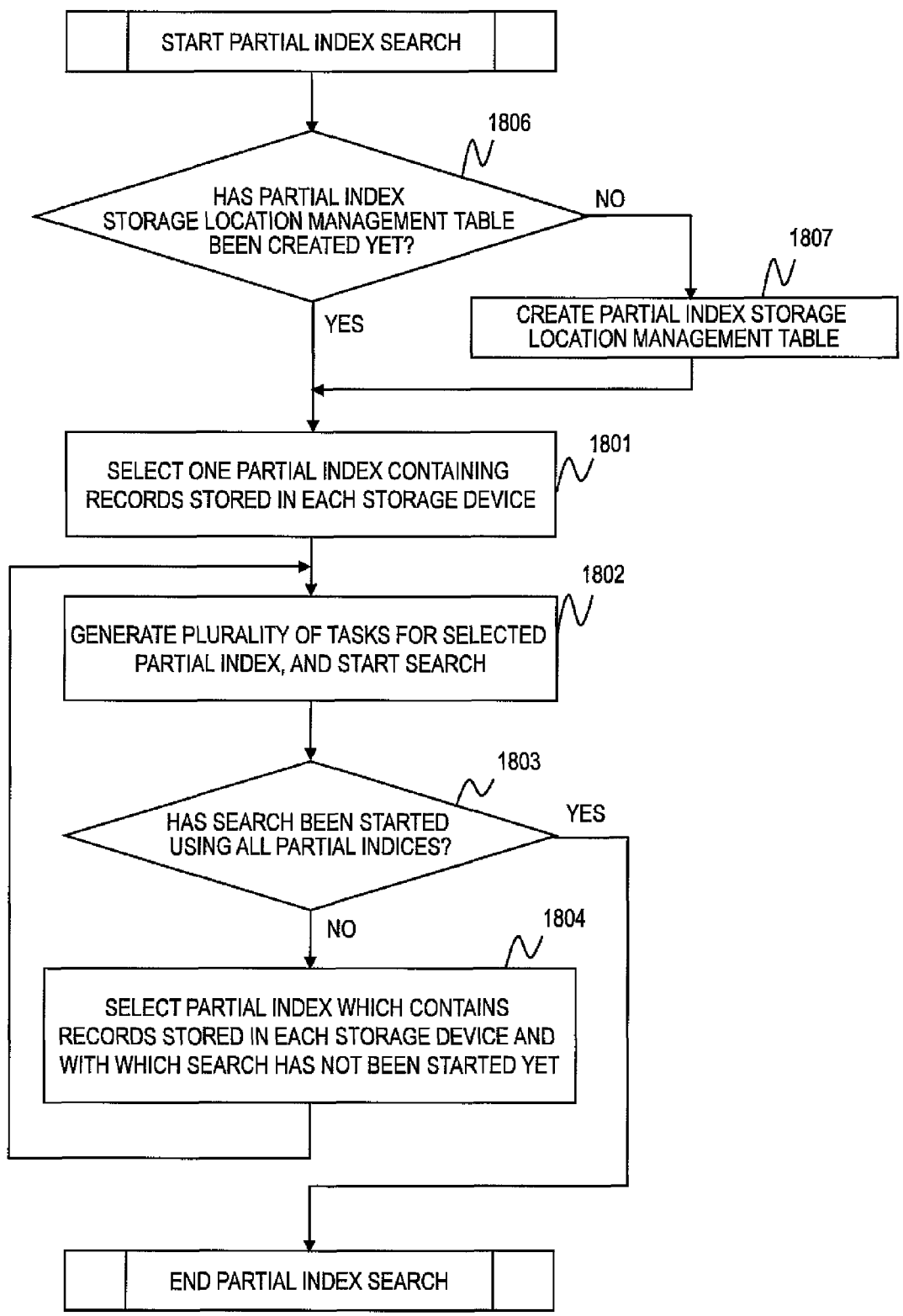
FIG. 15 is a flow chart illustrating procedures for index search according to the fifth embodiment of this invention.

FIG. 15 is a flow chart illustrating procedures for index search according to the fifth embodiment of this invention.

First, the processor 102 determines whether or not the partial index storage location management table 1900 has already been created (Step 1806). In a case where the partial index storage location management table 1900 has not been created yet (the result of Step 1806 is "No"), the processor 102 newly creates a partial index storage location management table 1900 (Step 1807).

Subsequently, the processor 102 references the partial index storage location management table 1900, and selects one partial index containing stored records for each storage device (Step 1801). When referencing the partial index storage location management table 1900 illustrated in FIG. 17, the processor 102 selects a partial index 001 containing records stored in the HDD having the HDD number 1902 of "01", and the partial index 003 containing records stored in the HDD having the HDD number 1902 of "02".

The processor 102 generates a plurality of tasks for each of the selected partial indices, and starts search in the generated tasks (Step 1802).

After that, the processor 102 determines whether or not the search has been started using all the partial indices (Step 1803). In a case where the search has been started using all the partial indices (the result of Step 1803 is "Yes"), the processor 102 ends the index search.

In a case where there remains a partial index with which the search has not been started yet (the result of Step 1803 is "No"), the processor 102 selects a partial index which contains stored records for each storage device and with which the search has not been started yet (Step 1804). Then, the processor 102 generates a plurality of tasks for the selected partial index, and starts the search in the generated tasks (Step 1802). When referencing the partial index storage location management table 1900 illustrated in FIG. 17, the processor 102 selects a partial index 002 which contains records stored in the HDD having the HDD number 1902 of "01" and with which the search has not been started yet, and starts the search. The above-mentioned processing is repeated until the search is started using all the partial indices.

Next, description is given of a processing of creating the partial index storage location management table 1900.

FIG. 16 is a flow chart illustrating procedures of creating the partial index storage location management table 1900 according to the fifth embodiment of this invention.

This processing is executed by executing the partial index storage location management module 1517.

First, the processor 102 initializes the counter that indicates a partial index to be processed. Specifically, the processor 102 sets the value N of the counter to "1" (Step 1851).

The processor 102 acquires a number of a storage device 155 that stores records associated with an N-th partial index. Specifically, the processor 102 specifies logical addresses of storage locations based on record pointers associated with the partial index, and further, references the mapping table 400 acquired using the external storage system structural information acquisition module 131, which is illustrated in FIG. 4, to thereby acquire the number for identifying the HDD that stores the group of records contained in the partial index. Then, the processor 102 stores the acquired number for identifying the HDD and the number for identifying the partial index in the partial index storage location management table 1900 (Step 1852).

When the processor 102 has finished the processing with respect to the N-th partial index, the processor 102 determines whether or not the N-th partial index is the last partial index (Step 1853). In a case where the N-th partial index is the last partial index (the result of Step 1853 is "Yes"), the processor 102 ends the processing of creating the partial index storage location management table 1900.

On the other hand, in a case where the N-th partial index is not the last partial index (the result of Step 1853 is "No"), the processor 102 updates the value N of the counter to "N+1" (Step 1854), and processes an (N+1)th partial index in a similar manner to the above.

It should be noted that the fifth embodiment of this invention describes the procedures of creating the partial index storage location management table 1900 with respect to the partial indices that have already been created, but the partial index storage location management table 1900 may be created in parallel to the processing of creating partial indices.

According to the fifth embodiment of this invention, after the search is executed using each partial index, I/O requests are issued intensively so that the storage locations have locality in each storage device, and further, in the case where data pieces of the table 154 are stored across a plurality of storage devices, I/O requests are issued in a parallel manner to the storage devices, respectively. Accordingly, the I/O requests are processed in parallel to one another in the storage devices, respectively, and hence the I/O request processing time period can further be shortened.

Sixth Embodiment

In a sixth embodiment of this invention, description is given of a processing of creating, when data is added to the table, an index associated with the added data. It should be noted that, in the following, description is given of a method of creating, after data is added to the table, an index associated with the added data, but the processing of creating an index associated with the added data may be executed in parallel to the processing of inserting additional data to the table.

A computer system according to the sixth embodiment of this invention has a configuration similar to that of the first embodiment, which is illustrated in FIG. 1. Further, the index structure of the sixth embodiment is also similar to that of the first embodiment. Hereinbelow, description is given of the processing of creating, when data is added to the table, an index associated with the added data.

First, the processor 102 determines whether or not the external storage system for storage 150 has any area for storing additional data. In a case where the external storage system for storage 150 runs short of the area for storing additional data, another storage device is added to extend the storage area, and the processor 102 uses the external storage system structural information acquisition module 131 to acquire and store the structural information of the external storage system for storage 150 which has the added storage area.

Subsequently, the processor 102 decides whether to create, when data is added to the table, an index associated with the added data as a new partial index, or to add an index associated with a part of the added data to the latest existing partial index, and then create an index associated with the remaining data as a new partial index. The partial index creation management module 130 may automatically make the above-mentioned decision based on information on the size of the latest partial index or the like, or the user may give an instruction of the decision to the partial index creation management module 130.

In a case where an index associated with the added data is created as a new partial index, according to the procedures of creating partial indices illustrated in FIG. 2A, the processor 102 uses the index data acquisition module 121 to acquire index information of the added data, and creates a partial index.

In a case where an index associated with a part of the added data is added to the latest existing partial index, and then an index associated with the remaining data is created as a new partial index, the index is created according to the following procedures. The following procedures are executed based on the index information of the added data, the index information of the data contained in the existing partial index, the mapping table 400 stored in the external storage system structural information acquisition module 131, and the locality determination criterion received by the locality determination criterion designation reception module 132.

First, the processor 102 stores the index information pieces of the data pieces contained in the existing partial index in the index information file storage area 122 as the index information file 600.

Subsequently, the processor 102 creates an index according to the procedures of creating partial indices illustrated in FIG. 2A.

The processor 102 reads one page of the added data pieces, and uses the index data acquisition module 121 to extract index information pieces necessary to create an index (Step 203).

The processor 102 determines whether or not the page thus read is the last page of the added data pieces (Step 204). In a case where the page thus read is not the last page of the added data pieces (the result of Step 204 is "No"), the processor 102 then determines whether or not the records from which the index information pieces have been extracted have locality in the external storage system for storage 150 with respect to the group of records contained in the index information file 600 (Step 205).

In a case where the records from which the index information pieces have been extracted have locality with respect to the group of records contained in the index information file 600 (the result of Step 205 is "Yes"), the processor 102 adds the extracted index information pieces to the index information file 600 (Step 211).

In a case where the group of records contained in the index information file 600 and the records from which the index information pieces have been extracted do not have locality (the result of Step 205 is "No"), the processor 102 newly sets another index information file 600 as an output destination of the index information pieces, and outputs the extracted index information pieces to the another index information file 600 (Step 206).

Further, the processor 102 newly generates a thread for creating an index, and creates a partial index based on the switched index information file 600 (Step 207).

When the processor 102 has finished the processing of Step 207, the processor 102 executes the processings of Step 203 and subsequent steps with respect to the subsequent records.

In a case where the page thus read is the last page of the added data pieces (the result of Step 204 is "Yes"), the processor 102 adds the extracted index information pieces to the index information file 600 (Step 208). Further, the processor 102 executes the processing of creating a partial index in another thread than that for the processing of extracting the index information (Step 209).

According to the sixth embodiment of this invention, a partial index can be created for each group of records having locality in terms of their storage locations in the external storage system. Further, an index associated with added data can be created at high speed while modification of the existing partial index is minimized.

Seventh Embodiment

In a seventh embodiment of this invention, description is given of a case where a plurality of storage devices or external storage systems for storage provide storage areas in a distributed manner, which are then integrated, and data pieces of the table are stored in the areas thus integrated.

Figure 18:
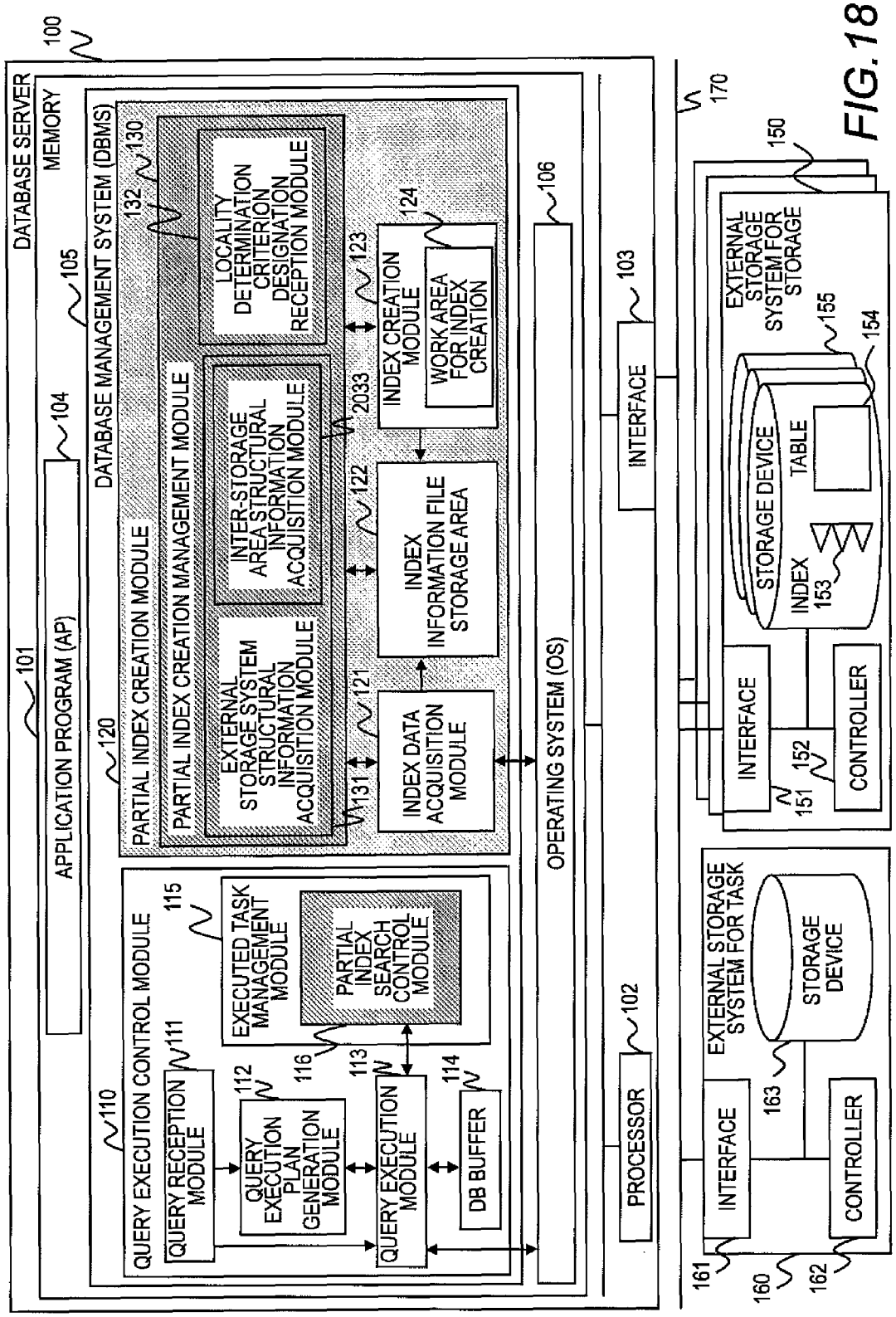
FIG. 18 is a block diagram illustrating a configuration of a computer system according to a seventh embodiment of this invention.

FIG. 18 is a block diagram illustrating a configuration of a computer system according to the seventh embodiment of this invention.

The database server 100 of the seventh embodiment of this invention is coupled to one or more external storage systems for storage 150 via the network 170. The external storage system structural information acquisition module 131 acquires structural information of the one or more external storage systems for storage 150 coupled thereto. Further, the external storage system structural information acquisition module 131 includes an inter-storage area structural information acquisition module 2033 for acquiring mutual structural information of storage areas provided by the one or more external storage systems for storage 150 coupled thereto.

Figure 19:
FIG. 19 is a diagram illustrating a mapping table showing a mapping between logical addresses and physical addresses, which is an example of structural information of an external storage systems for storage according to the seventh embodiment of this invention.

FIG. 19 is a diagram illustrating a mapping table 2100 showing a mapping between logical addresses and physical addresses, which is an example of the structural information of the external storage systems for storage 150 according to the seventh embodiment of this invention.

The mapping table 2100 contains a logical address 2101 recognized by the database server 100, and a physical address 2102 associated with the logical address 2101. The logical address 2101 is the same as the logical address 401 of the mapping table 400 of the first embodiment. The physical address 2102 has an external storage system number added in addition to the structure of the physical address 402 of the first embodiment. The external storage system number is identification information of the external storage system.

Figure 20:
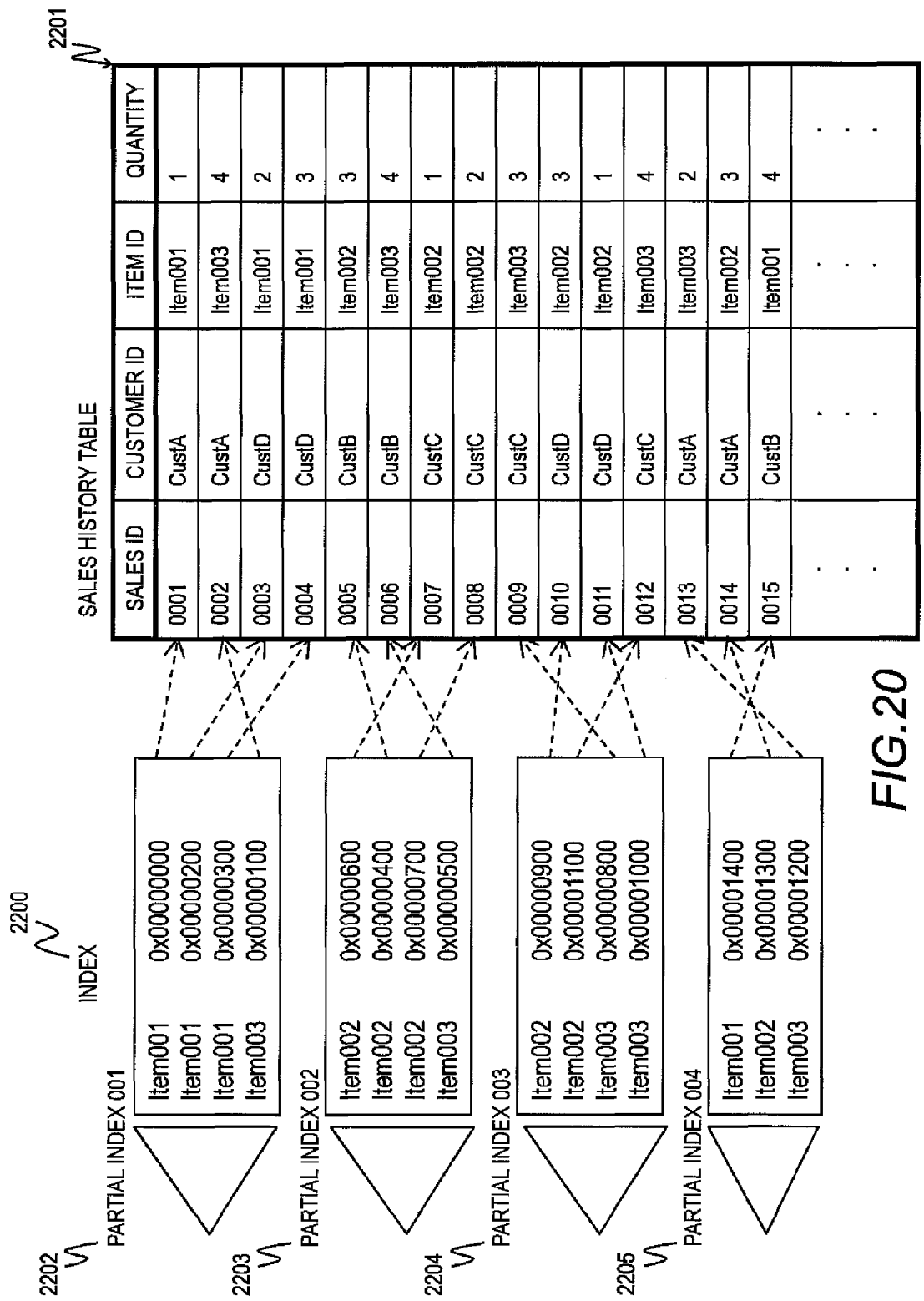
FIG. 20 is an explanatory diagram illustrating a relation between an index and a sales history table according to the seventh embodiment of this invention.

FIG. 20 is an explanatory diagram illustrating a relation between an index 2200 and a sales history table 2201 according to the seventh embodiment of this invention.

Hereinbelow, description is given of procedures for an index creation processing according to the seventh embodiment.

First, the processor 102 uses the external storage system structural information acquisition module 131 to acquire the structural information of the one or more external storage systems for storage 150 coupled to the database server 100. Further, the processor 102 uses the inter-storage area structural information acquisition module 2033 to acquire structural information of the storage areas provided by the one or more external storage systems for storage 150 coupled to the database server 100, and creates the mapping table 2100.

For example, in a case where the operating system 106 of the database server 100 uses a logical volume manager (LVM) to integrate a plurality of logical units (LUs) created in the one or more external storage systems for storage 150 coupled to the database server 100 so as to create one logical volume, the processor 102 creates the mapping table 2100 based on structural information of each LU, which is acquired from each external storage system for storage 150, and LVM structural information acquired from the operating system 106.

If a management command is provided by the operating system 106, the management command is used to acquire the structural information of the storage areas provided by the one or more external storage systems for storage 150 coupled to the database server 100. Alternatively, a database designer who has designed the one or more external storage systems for storage 150 coupled to the database server 100 may create a file into which the mapping table 2100 is written, and the inter-storage area structural information acquisition module 2033 may be notified of the file. Still alternatively, the inter-storage area structural information acquisition module 2033 may be notified of necessary information via an interface such as a GUI.

Subsequently, the processor 102 creates partial indices according to the procedures of creating an index of the first embodiment, which are illustrated in FIG. 2A. With regard to the locality determination, it is determined based on, for example, the mapping table 2100, that records have locality if the records are stored in storage areas each having the same external storage system number and HDD number.

According to the seventh embodiment of this invention, a partial index is created for each group of records stored at local locations of each storage device, among data pieces stored in the plurality of external storage systems, and accordingly, even in the database processing system including the plurality of external storage systems, the I/O processing time period necessary for search can be shortened.

Eighth Embodiment

In an eighth embodiment of this invention, when the index search using partial indices is executed, a metaindex that holds information for narrowing partial indices to be used for search is created, to thereby achieve high-speed index search.

Figure 21:
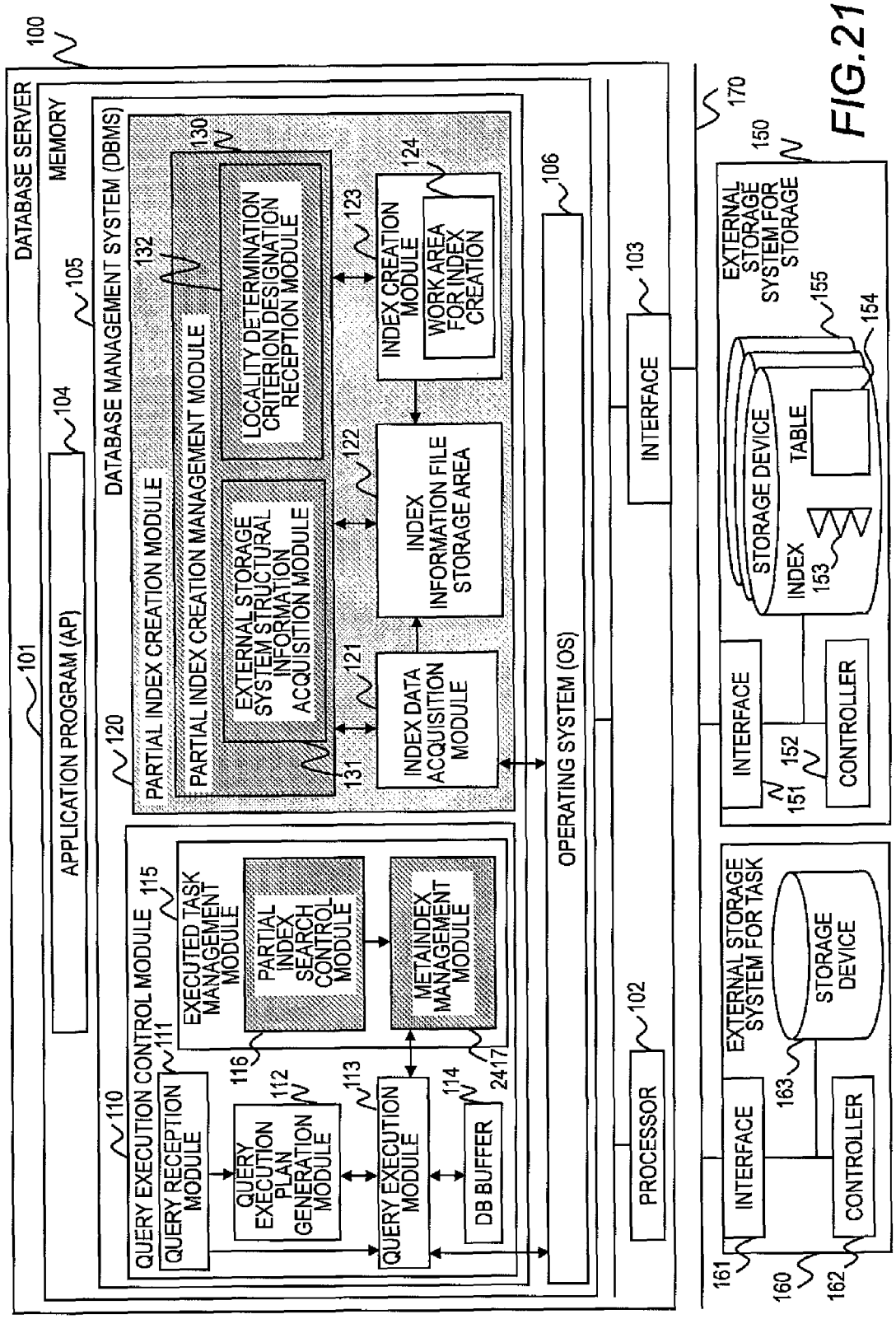
FIG. 21 is a block diagram illustrating a configuration of a computer system according to an eighth embodiment of this invention.

FIG. 21 is a block diagram illustrating a configuration of a computer system according to the eighth embodiment of this invention.

In the computer system according to the eighth embodiment of this invention, the executed task management module 115 includes a metaindex management module 2417 in addition to the configuration of the first embodiment. The metaindex management module 2417 creates and manages a metaindex for narrowing partial indices to be used for search when the index search using partial indices is executed. Specific procedures thereof are described later referring to FIGS. 23 and 24.

Figure 22:
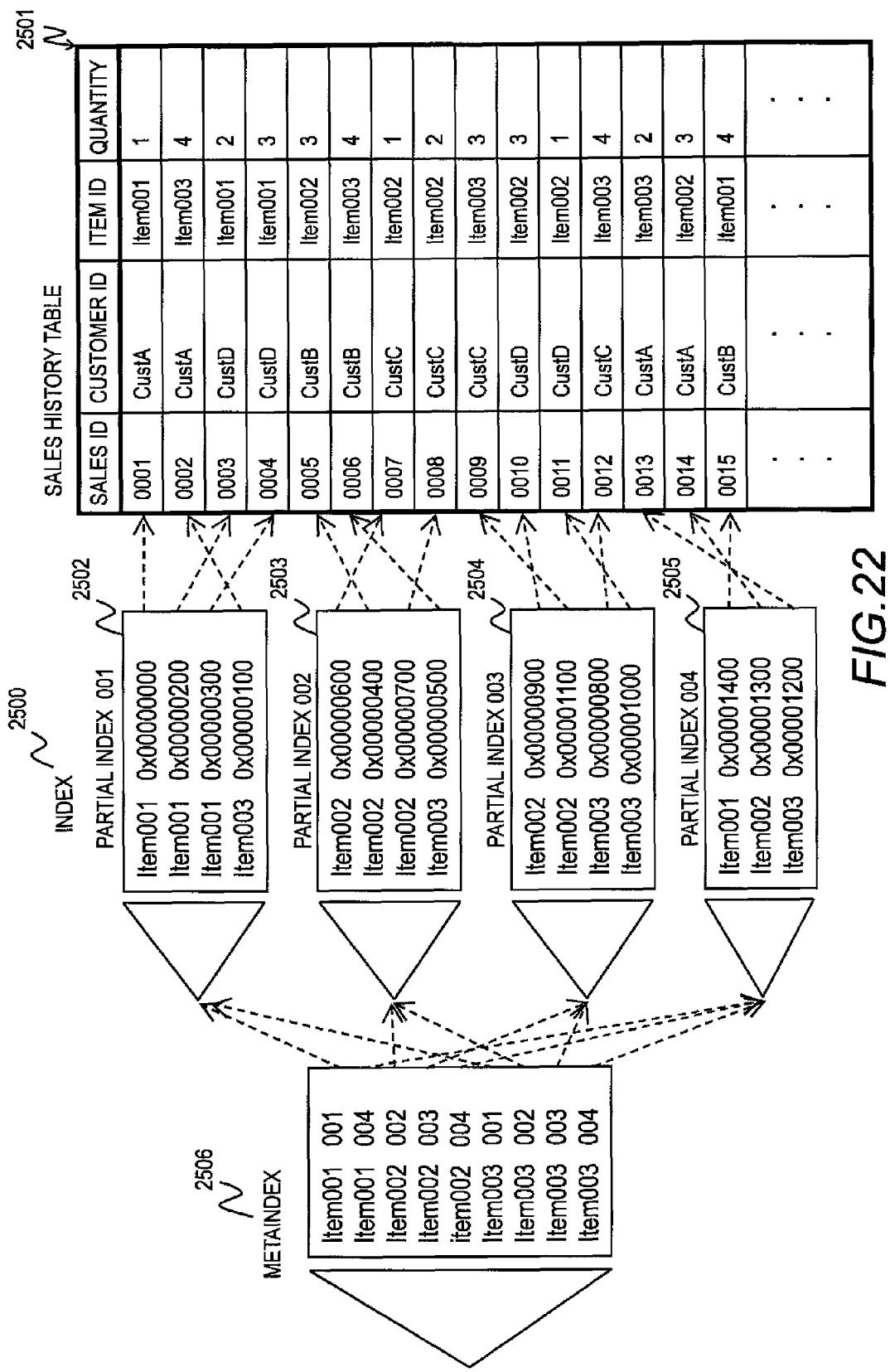
FIG. 22 is an explanatory diagram illustrating a relation among a metaindex, an index, and a sales history table according to the eighth embodiment of this invention.

FIG. 22 is an explanatory diagram illustrating a relation among a metaindex 2506, an index 2500, and a sales history table 2501 according to the eighth embodiment of this invention.

In the metaindex 2506, an item ID, which bases the index, and identification information of a partial index serving as an index containing a record associated with the item ID are stored. Specifically, it is found based on the metaindex 2506 that partial indices "001" and "004" serve as indices containing the record associated with an item ID "Item001".

In the eighth embodiment of this invention, when the index search is executed, the metaindex 2506 is first searched to specify a partial index associated with a record of a search target, and then the record is acquired. In this manner, not all the partial indices need to be used for search, and accordingly, high-speed index search can be achieved. Hereinbelow, description is given of procedures for an index search processing according to the eighth embodiment of this invention.

Figure 23:
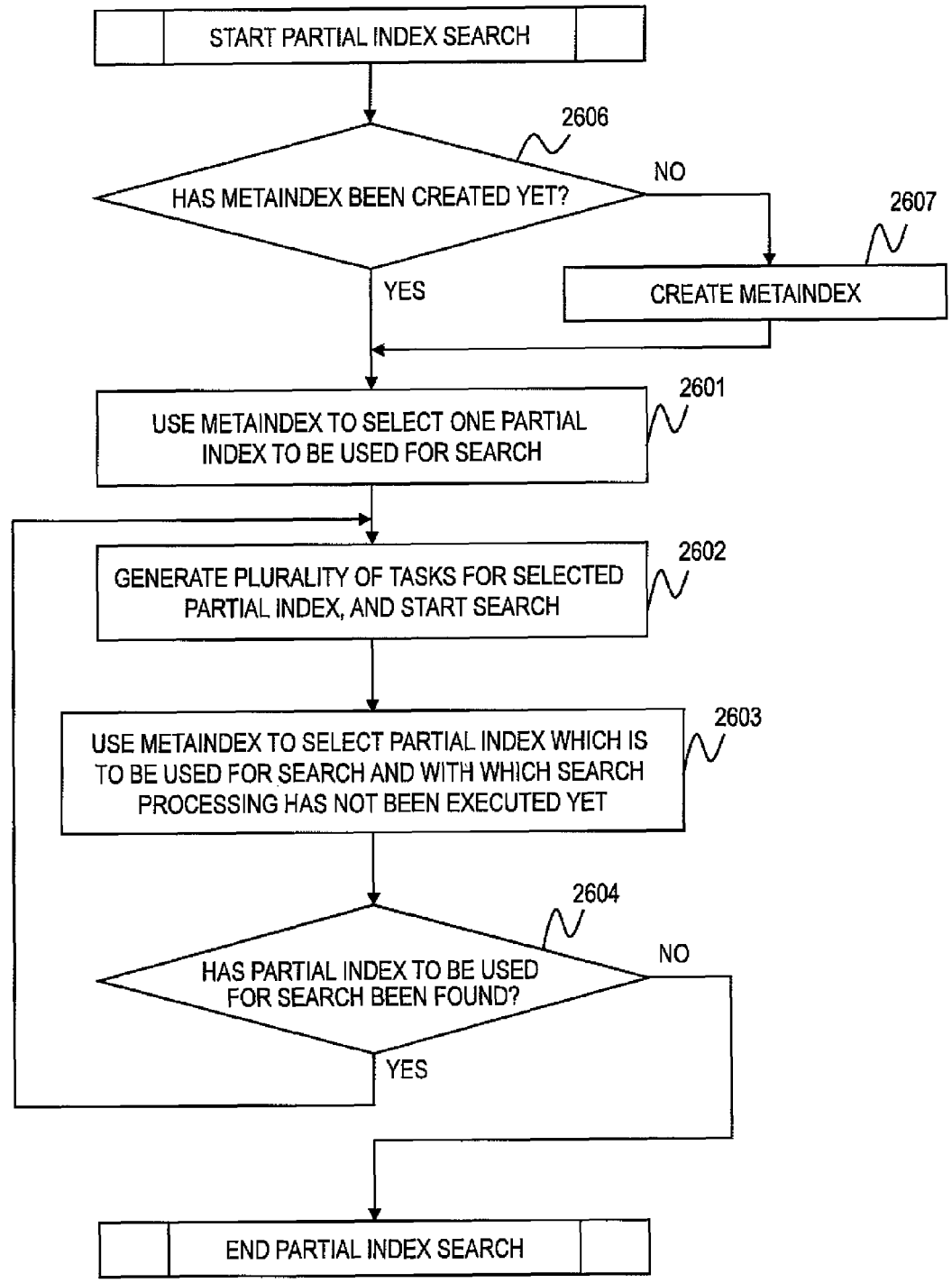
FIG. 23 is a flow chart illustrating procedures for index search according to the eighth embodiment of this invention.

FIG. 23 is a flow chart illustrating procedures for index search according to the eighth embodiment of this invention.

Figure 24:
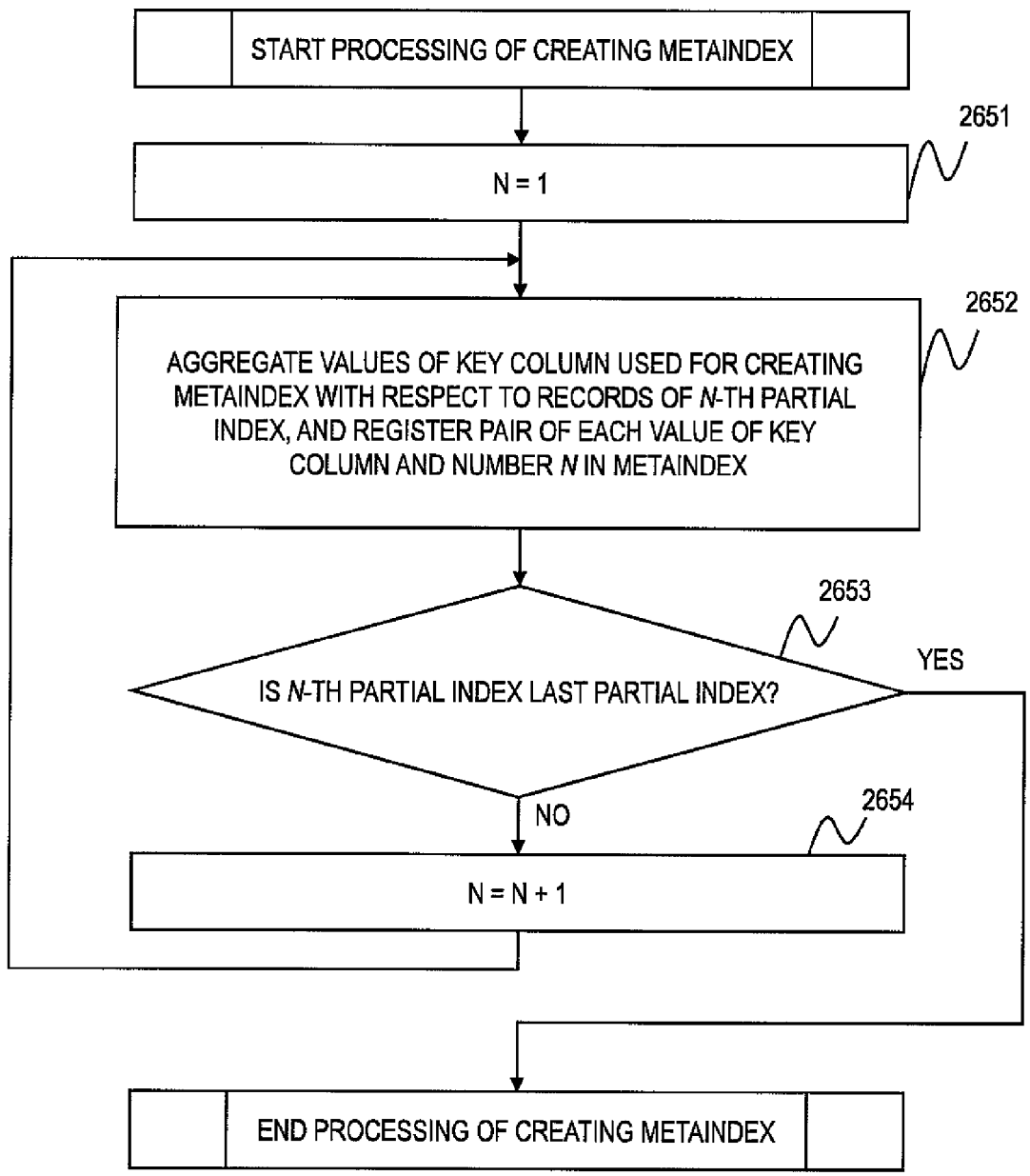
FIG. 24 is a flow chart illustrating procedures of creating a metaindex according to the eighth embodiment of this invention.

First, the processor 102 determines whether or not the metaindex has already been created (Step 2606). In a case where the metaindex has not been created yet (the result of Step 2606 is "No"), the processor 102 uses the metaindex management module 2417 to newly create a metaindex (Step 2607). FIG. 24 illustrates a processing of creating a metaindex.

FIG. 24 is a flow chart illustrating procedures of creating a metaindex according to the eighth embodiment of this invention.

First, the processor 102 initializes the counter that indicates a partial index to be processed. Specifically, the processor 102 sets the value N of the counter to "1" (Step 2651).

The processor 102 creates a metaindex with respect to an N-th partial index (Step 2652). In the processing of creating a metaindex, one partial index is referenced to specify a key column of records contained in the partial index, which is used for creating a metaindex, and values corresponding to the key column are acquired.

For example, in a case where the metaindex 2506 of the index 2500 for the sales history table 2501 illustrated in FIG. 22 is created with the item ID serving as a key column, values of item IDs of records contained in the partial index 001 are acquired. As a result, "Item001" and "Item003" are acquired as the values of the item IDs of the records contained in the partial index 001.

Based on the values acquired through the above-mentioned processing, the processor 102 registers (Item001, 001), which is a pair of the value "Item001" of the key column and the partial index number "001", and (Item003, 001), which is a pair of the value "Item003" of the key column and the partial index number "001", in the metaindex 2506.

When the processor 102 has finished the processing with respect to the N-th partial index, the processor 102 determines whether or not the N-th partial index is the last partial index (Step 2653). In a case where the N-th partial index is the last partial index (the result of Step 2653 is "Yes"), the processor 102 ends the processing of creating a metaindex.

On the other hand, in a case where the N-th partial index is not the last partial index (the result of Step 2653 is "No"), the processor 102 updates the value N of the counter to "N+1" (Step 2654), and processes an (N+1)th partial index in a similar manner to the above.

The above-mentioned procedures are executed with respect to all the partial indices, to thereby create a metaindex. It should be noted that the eighth embodiment of this invention describes the procedures of creating the metaindex 2506 with respect to partial indices that have already been created, but the metaindex 2506 may be created in parallel to the execution of the processing of creating partial indices.

The flow chart of the index search processing illustrated in FIG. 23 is described again.

The processor 102 references the metaindex to select a partial index which is to be used for search (Step 2601). In the example of FIG. 22, in a case of "search for a sales history of 'item ID=Item001'", the processor 102 first references the metaindex 2506 to specify the partial index 001 as a partial index containing the sales history of "Item001", and selects the partial index 001. Then, the processor 102 dynamically generates a plurality of tasks to execute the search processing using the selected partial index 001 (Step 2602).

The processor 102 further references the metaindex to select a partial index which is to be used for search and with which the search processing has not been executed yet (Step 2603). In the example of FIG. 22, the processor 102 selects the partial index 004 which contains the sales history of "Item001" and with which the search processing has not been executed yet. Then, the processor 102 dynamically generates a plurality of tasks, and starts the search processing using the selected partial index 004 in a similar manner to the above (Step 2602).

The processor 102 further references the metaindex to determine whether or not there remains a partial index which is to be used for search and with which the search processing has not been executed yet (Step 2604).

In the example of FIG. 22, it is the partial indices 001 and 004 that are associated with the record having "Item001" as the item ID, and there remains no other partial index to be selected (the result of Step 2604 is "No"). Hence, the processor 102 ends the index search.

According to the eighth embodiment of this invention, the metaindex is used and partial indices to be used for search are narrowed, to thereby shorten the search processing time period. In particular, the eighth embodiment is effective in a case of a large-scale database that contains a large number of records, such as a case where the number of partial indices is large.

Ninth Embodiment

In a ninth embodiment of this invention, description is given of procedures for search using partial indices in a case where the application program 104 simultaneously issues a plurality of query requests to the database management system 105.

Figure 25:
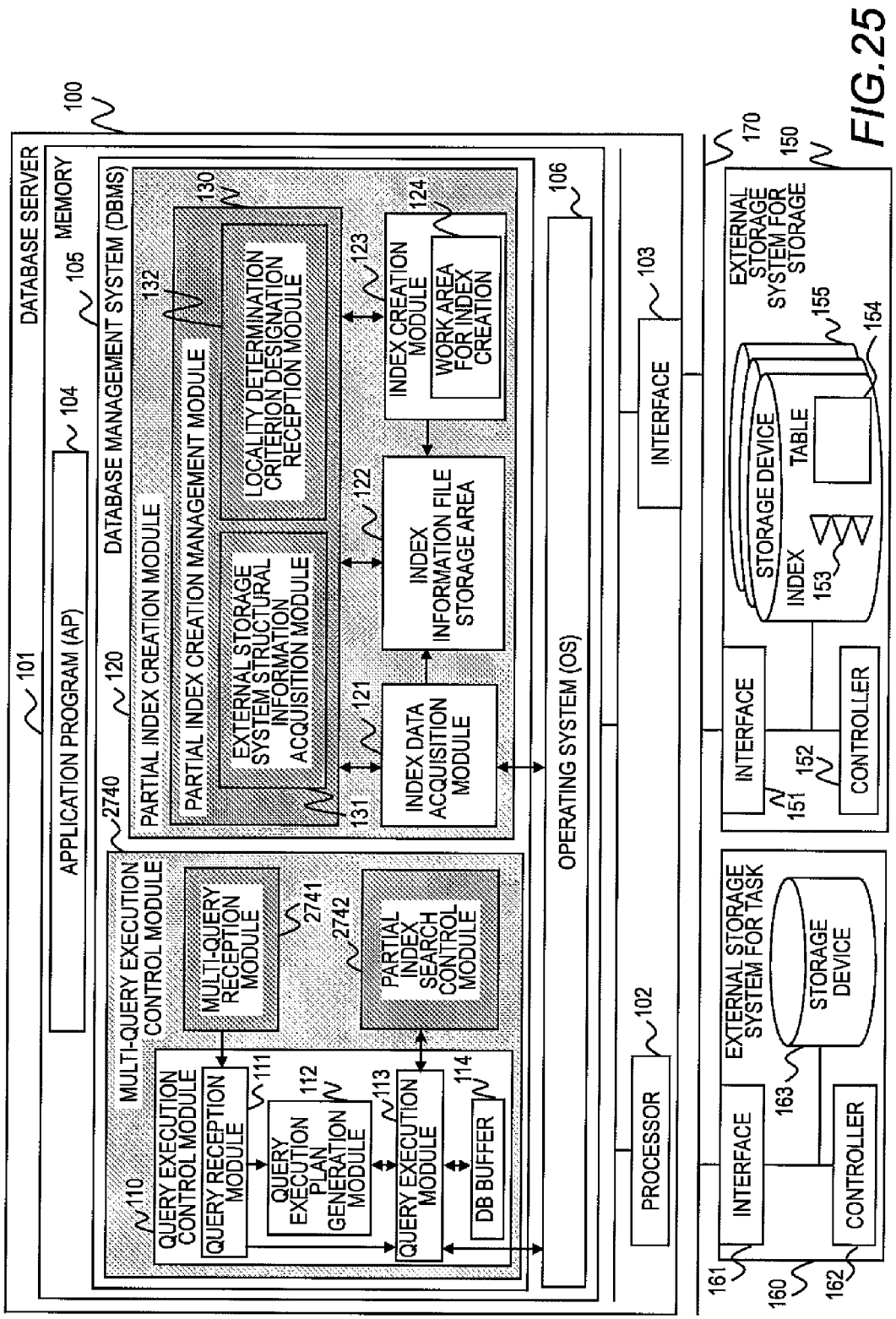
FIG. 25 is a block diagram illustrating a configuration of a computer system according to a ninth embodiment of this invention.

FIG. 25 is a block diagram illustrating a configuration of a computer system according to the ninth embodiment of this invention.

The application program 104 is executed by the processor 102, and processes various kinds of tasks. When processing the tasks, the application program 104 issues a query to the database management system 105, and receives a query result therefrom. In the ninth embodiment of this invention, the application program 104 simultaneously issues, to the database management system 105, a considerable number of queries which are different from one another only in argument of a search condition. Referring to FIGS. 26A to 26C, specific examples of such queries are described later.

The database management system 105 according to the ninth embodiment of this invention includes a multi-query execution control module 2740.

The multi-query execution control module 2740 includes a multi-query reception module 2741, a partial index search control module 2742, and the query execution control module 110.

The multi-query reception module 2741 simultaneously receives a plurality of query requests issued from the application program 104. The partial index search control module 2742 controls the search processing using partial indices with respect to the plurality of query requests.

The query execution control module 110 processes one query request after another. Similarly to the first embodiment, the query execution control module 110 includes the query reception module 111, the query execution plan generation module 112, the query execution module 113, and the DB buffer 114. The components include in the query execution control module 110 are similar to those of the first embodiment. As described above, the query execution module 113 is provided with basic database operations for generating a query result. The query execution plan refers to processing procedures obtained by combining the database operations in order to generate a query result.

FIGS. 26A to 26C are diagrams illustrating examples of the queries that are simultaneously issued according to the ninth embodiment of this invention.

As illustrated in FIGS. 26A to 26C, in the ninth embodiment of this invention, queries are written in the SQL. The queries issued from the application program 104 to the database management system 105 are common to one another in terms of the index to be referenced, and as described above, are different from one another only in argument of a search condition.

Specifically, as illustrated in FIGS. 26A to 26C, the queries are different from one another only in argument of a search condition as indicated by "Item001", "Item002", and "Item003", respectively. Other designation of the search condition is identical among the queries.

It should be noted that the index is similar to the index 2200 of the seventh embodiment of this invention, which is illustrated in FIG. 20. Hereinbelow, referring to FIG. 27, description is given of procedures of processing the plurality of queries as illustrated in FIGS. 26A to 26C.

Figure 27:
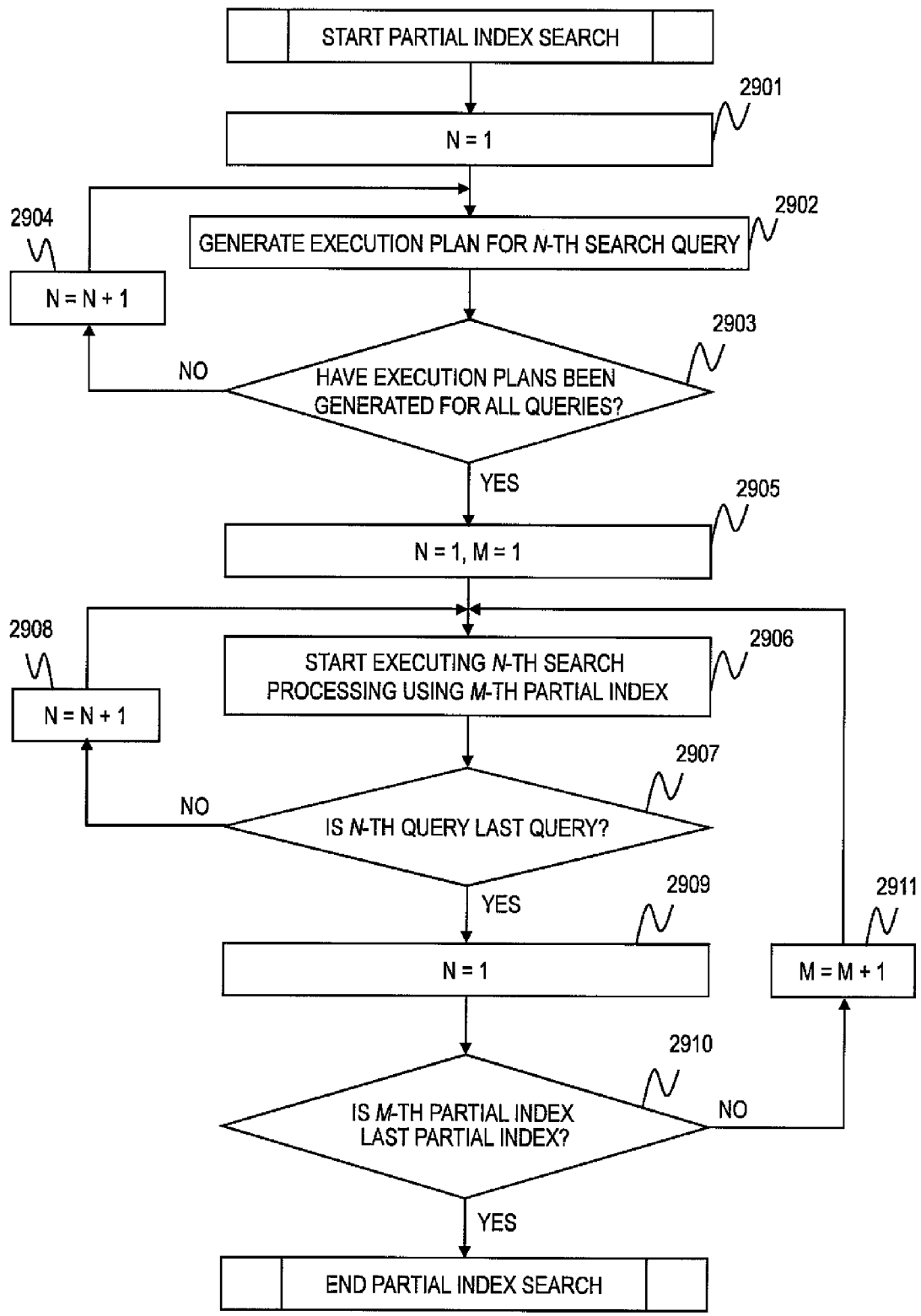
FIG. 27 is a flow chart illustrating procedures for index search according to the ninth embodiment of this invention.

FIG. 27 is a flow chart illustrating procedures for index search according to the ninth embodiment of this invention.

When the application program 104 has simultaneously issued a plurality of query requests for which the same partial index may be used, the processor 102 uses the multi-query reception module 2741 of the database management system 105 to receive the query requests.

The processor 102 generates query execution plans for the plurality of queries thus received, respectively. Specifically, the processor 102 first sets the value N of the counter for the plurality of queries thus received to "1" as initialization (Step 2901). Subsequently, the processor 102 uses the query execution plan generation module 112 to generate a query execution plan for an N-th query (Step 2902).

The processor 102 determines whether or not query execution plans have been generated for all the received queries (Step 2903). In a case where query execution plans have not been generated for all the received queries (the result of Step 2903 is "No"), the processor 102 adds "1" to the value N of the counter (Step 2904), and generates query execution plans for the remaining queries (Step 2902).

In a case where query execution plans have been generated for all the received queries (the result of Step 2903 is "Yes"), the processor 102 starts processing each of the queries. In the search processing of the ninth embodiment of this invention, each of the queries is executed using each partial index.

The processor 102 initializes the value N of the counter that corresponds to the query and a value M of a counter that corresponds to the partial index (Step 2905). Then, the processor 102 starts the N-th query using the M-th partial index (Step 2906).

Specific description is given referring to the index information of FIG. 20 and the queries of FIGS. 26A to 26C. First, the processor 102 starts a processing of a first query request 2800 using the partial index 001 (2202) (Step 2906). Subsequently, the processor 102 starts a processing of a second query request 2801 using the partial index 001 (2202) (Step 2908 and Step 2906), and then starts a processing of a third query request 2802 using the partial index 001 (2202).

At this time, the processor 102 has started the processings up to the third (last) query request 2802 using the partial index 001 (2202) (the result of Step 2907 is "Yes"), and hence the processor 102 subsequently starts the processing starting from the first query request 2800 using the partial index 002 (2203) (Step 2909, Step 2910, and Step 2911). Subsequently, the processor 102 starts the processing of the second query request 2801 using the partial index 002. In the following steps, the processor 102 executes the three query requests using up to the partial index 004 through the similar procedures to the above.

As described above, according to the ninth embodiment of this invention, in the case where the plurality of query requests different from one another only in argument of a search condition are executed, it is possible that the processor 102 uses the multi-query execution control module 2740 to aggregate the input and output with respect to the partial indices, and to collectively issue I/O requests for data pieces stored at local locations of the storage device. Accordingly, the I/O request processing time period can be shortened owing to the function of scheduling I/O requests, which is provided to the external storage system for storage 150.

Tenth Embodiment

In a tenth embodiment of this invention, description is given of a processing performed when data stored in the database is updated.

Figure 28:
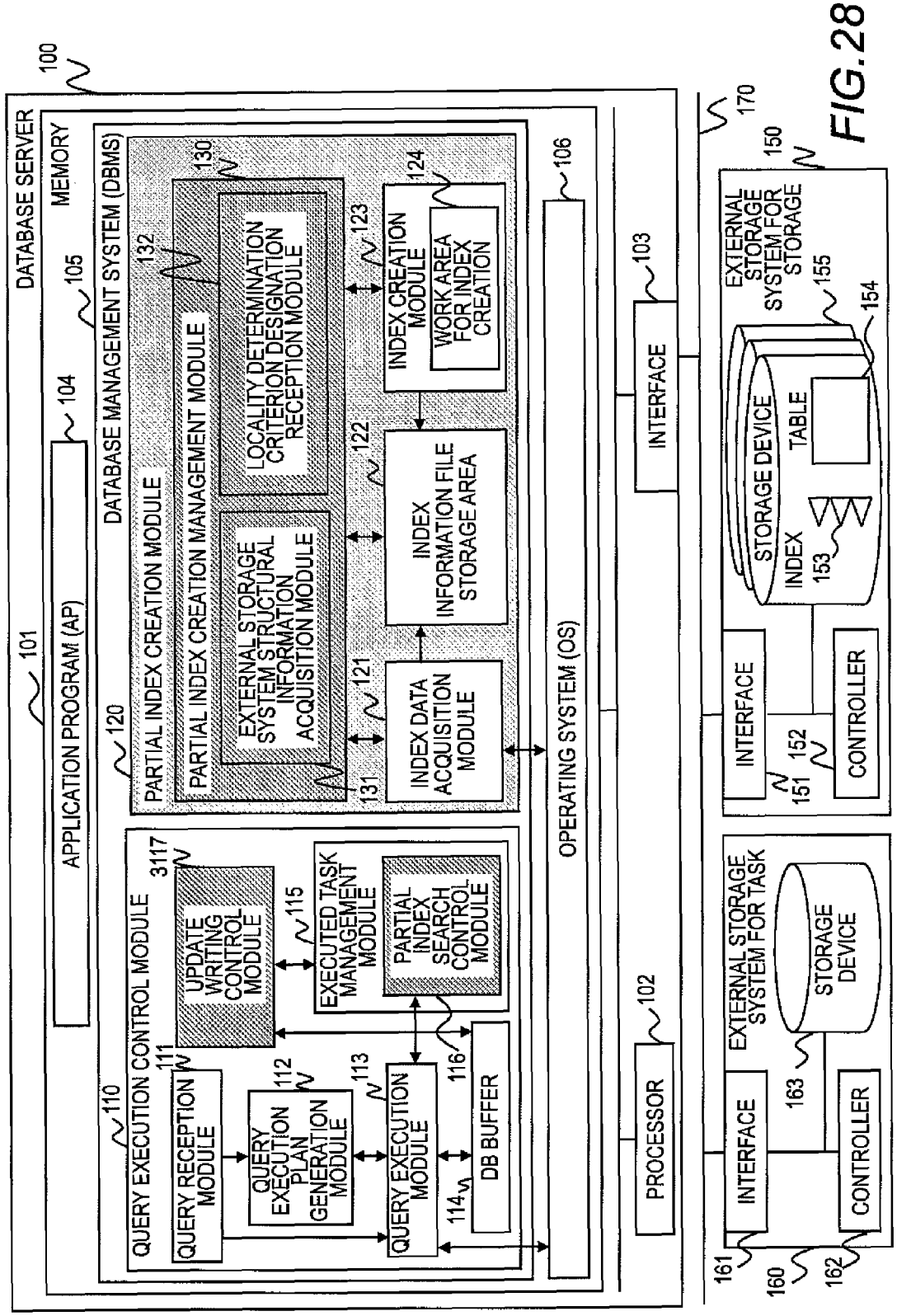
FIG. 28 is a block diagram illustrating a configuration of a computer system according to a tenth embodiment of this invention.

FIG. 28 is a block diagram illustrating a configuration of a computer system according to the tenth embodiment of this invention.

The executed task management module 115 of the query execution control module 110 includes an update writing control module 3117 for controlling a processing of reflecting a result of an update request on the external storage system for storage 150.

Figure 29:
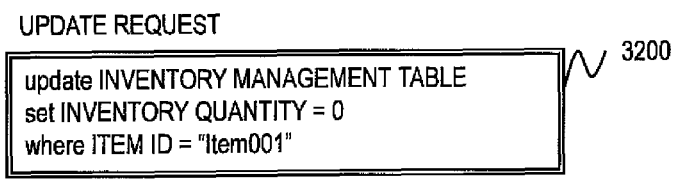
FIG. 29 is a diagram illustrating an example of an update request issued from an application program to a database management system according to the tenth embodiment of this invention.

FIG. 29 is a diagram illustrating an example of an update request issued from the application program 104 to the database management system 105 according to the tenth embodiment of this invention.

The update request illustrated in FIG. 29 corresponds to a processing of updating, in a case where items having the item ID "Item001" are all purchased, an inventory quantity of each warehouse to "0".

Figure 30:
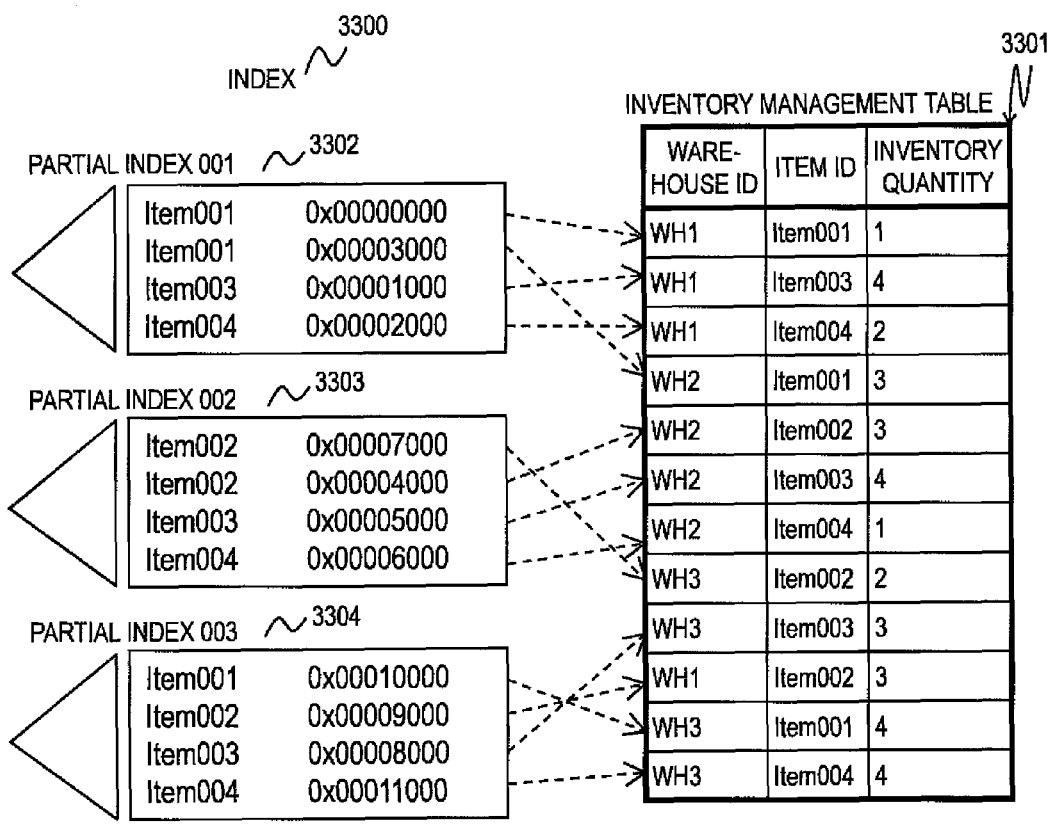
FIG. 30 is an explanatory diagram illustrating a relation between an index and an inventory management table according to the tenth embodiment of this invention.

FIG. 30 is an explanatory diagram illustrating a relation between an index 3300 and an inventory management table 3301 according to the tenth embodiment of this invention.

When the update request of FIG. 29 is executed, records having the item ID "Item001" of the inventory management table 3301 are updated and the inventory quantity of each of the records is set to "0". Specifically, in records respectively having "0x00000000", "0x00003000", and "0x00010000" as values of record pointers thereto, the inventory quantity thereof is set to "0".

Hereinbelow, description is given of the data update processing according to the tenth embodiment of this invention.

When an update request 3200 is issued from the application program 104 to the database management system 105, the processor 102 uses the query reception module 111 of the query execution control module 110 to receive the update request 3200.

The processor 102 uses the query execution plan generation module 112 to generate a query execution plan for processing the received update request 3200. Further, the processor 102 uses the query execution module 113 to dynamically generate tasks, and to execute the processing according to the generated query execution plan.

When executing the update request 3200, the processor 102 first searches for records having the item ID "Item001". In a case where the records of the search target are stored in the DB buffer 114, the processor 102 acquires the records from the DB buffer 114. In a case where the records are not stored in the DB buffer 114, the processor 102 acquires the records from the external storage system for storage 150.

Procedures of searching the external storage system for storage 150 for records are similar to the procedures described in the first embodiment.

When the processor 102 has acquired the records, the processor 102 updates the inventory quantity thereof to "0", and stores an update result in the DB buffer 114. The processor 102 executes the processing of updating the inventory quantity with respect to all the records having the item ID "Item001". The processor 102 searches the external storage system for storage 150 for records by following the procedures similar to the procedures described in the first embodiment, and hence records contained in partial indices are acquired in an order of the partial indices, with the result that the group of acquired records have locality in the storage device 155 in an order of the acquisition.

At a timing such as a time point at which the query execution control module 110 has received an instruction from the application program 104, or a case where the number of updated records stored in the DB buffer 114 has exceeded a value set in advance by the database designer, the query execution control module 110 writes the group of updated records stored in the DB buffer 114 over the corresponding records stored in the external storage system for storage 150.

According to the tenth embodiment of this invention, the group of acquired records have locality in the storage device 155 in the order of the acquisition, and accordingly, the data update processing (data writing processing) can be executed collectively at local locations of the storage device 155. As a result, similarly to the search processing, the time period necessary for the data update processing can be shortened.

While the present invention has been described in detail and pictorially in the accompanying drawings, the present invention is not limited to such detail but covers various obvious modifications and equivalent arrangements, which fall within the purview of the appended claims.

What is claimed is:

1. A database processing method used in a database processing system including:
    a computer for outputting data in response to a received query request; and
    a storage system for storing the data to be output by the computer,
    the computer including:
    a first interface coupled to the storage system;
    a processor coupled to the first interface; and
    a memory coupled to the processor,
    the storage system including:
    a second interface coupled to the computer;
    a controller coupled to the second interface; and
    a storage device for storing the data,
    the storage device storing an index indicating a storage location of the data,
    the index including a plurality of partial indices created based on the storage location of the data,
    the data stored in the storage device being grouped, based on the storage location of the data, into a plurality of data groups,
    the plurality of partial indices each indicating the storage location of the data included in one of the plurality of data groups,
    the database processing method including the steps of:
    receiving, by the processor, the query request for the data stored in the storage device;
    acquiring, by the processor, one of the plurality of partial indices from the index;
    specifying, by the processor, based on the query request for the data and the acquired one of the plurality of partial indices, a location at which the requested data is stored; and
    sending, by the processor, a request to acquire the data stored at the specified location to the storage system.

2. The database processing method according to claim 1, further including the steps of:
    acquiring, by the processor, storage location information of the data;
    grouping, by the processor, based on the acquired storage location information of the data, the data stored within a predetermined range of the storage device, into the plurality of data groups; and
    storing, by the processor, in the storage device, the storage location information of the data included in the plurality of data groups as the plurality of partial indices.

3. The database processing method according to claim 2, further including the steps of:
    storing, by the processor, in a case where a request to add data is received, the requested data to be added, in the storage device;
    specifying, by the processor, one of the plurality of partial indices that is created last in the index;
    determining, by the processor, based on storage location information of the added data, whether or not to add the location information of the added data to the one of the plurality of partial indices that is created last;
    adding, by the processor, in a case where the storage location information of the added data is determined to be added to the one of the plurality of partial indices that is created last, the storage location information of the added data to the one of the plurality of partial indices that is created last;
    creating, by the processor, in a case where the added data is not determined to be added to the one of the plurality of partial indices that is created last, a new partial index; and
    adding, by the processor, the storage location information of the added data to the created new partial index.

4. The database processing method according to claim 1, wherein the storage location information of the data includes physical location information on a storage medium included in the storage device.

5. The database processing method according to claim 1, wherein each of the plurality of partial indices is smaller in capacity than an area being allocated on the memory for storing the each of the plurality of partial indices.

6. The database processing method according to claim 1, wherein:
    the index further includes a metaindex including mapping information between the data and the one of the plurality of partial indices; and
    the database processing method further includes the step of acquiring, by the processor, based on the query request for the data and the metaindex, the one of the plurality of partial indices from the index.

7. The database processing method according to claim 1, further including the steps of:
    generating, by the processor, based on the query request for the data, a plurality of tasks executable in parallel to one another; and
    sending, by the processor, in each of the generated plurality of tasks, the request to acquire the requested data to the storage system.

8. The database processing method according to claim 7, further including the step of starting, by the processor, after search is started with respect to a whole of data included in the selected one of the plurality of partial indices, search based on another one of the plurality of partial indices that is to be selected next.

9. The database processing method according to claim 7, wherein:
the storage device comprises a plurality of storage media; and
the database processing method further includes the steps of:
selecting, by the processor, some of the plurality of partial indices having their associated data stored on different storage media; and
executing, by the processor, the plurality of tasks for searching for the requested data in parallel to one another based on the selected some of the plurality of partial indices.

10. The database processing method according to claim 1, further including the steps of:
determining, by the processor, in a case where a plurality of the query requests are received, whether or not it is possible to use the same partial index to process the plurality of the query requests;
generating, by the processor, in a case where it is possible to use the same partial index to process the plurality of the query requests, a query execution plan for processing the plurality of the query requests for each of the plurality of partial indices; and
processing, by the processor, the generated query execution plan for the each of the plurality of partial indices.

11. A database processing system, comprising:
a computer for outputting data in response to a received query request; and
a storage system for storing the data to be output by the computer, wherein:
the computer comprises:
a first interface coupled to the storage system;
a processor coupled to the first interface; and
a memory coupled to the processor;
the storage system comprises:
a second interface coupled to the computer;
a controller coupled to the second interface; and
a storage device for storing the data;
the storage device stores an index indicating a storage location of the data;
the index includes a plurality of partial indices created based on the storage location of the data;
the data stored in the storage device is grouped, based on the storage location of the data, into a plurality of data groups;
the plurality of partial indices each indicate the storage location of the data included in one of the plurality of data groups; and
the computer is configured to:
receive the query request for the data stored in the storage device;
acquire one of the plurality of partial indices from the index;
specify, based on the query request for the data and the acquired one of the plurality of partial indices, a location at which the requested data is stored; and
send a request to acquire the data stored at the specified location to the storage system.

12. The database processing system according to claim 11, wherein the computer is further configured to:
acquire storage location information of the data;
group, based on the acquired storage location information of the data, the data stored within a predetermined range of the storage device, into the plurality of data groups; and
store, in the storage device, the storage location information of the data included in the plurality of data groups as the plurality of partial indices.

13. The database processing system according to claim 11, wherein each of the plurality of partial indices is smaller in capacity than an area being allocated on the memory for storing the each of the plurality of partial indices.

14. The database processing system according to claim 11, wherein the computer is further configured to:
generate, based on the query request for the data, a plurality of tasks executable in parallel to one another; and
send, in each of the generated plurality of tasks, the request to acquire the requested data to the storage system.

15. The database processing system according to claim 14, wherein:
the storage device comprises a plurality of storage media; and
the computer is further configured to:
select some of the plurality of partial indices having their associated data stored on different storage media; and
execute the plurality of tasks for searching for the requested data in parallel to one another based on the selected some of the plurality of partial indices.

16. A database server for outputting data stored in a storage system in response to a received query request, the database server comprising:
an interface coupled to the storage system;
a processor coupled to the interface; and
a memory coupled to the processor,
the storage system storing an index indicating a storage location of the data,
the index including a plurality of partial indices created based on the storage location of the data,
the data stored in the storage system being grouped, based on the storage location of the data, into a plurality of data groups,
the plurality of partial indices each indicating the storage location of the data included in one of the plurality of data groups,
wherein the processor is configured to:
receive the query request for the data stored in the storage system;
acquire one of the plurality of partial indices from the index;
specify, based on the query request for the data and the acquired one of the plurality of partial indices, a location at which the requested data is stored; and
send a request to acquire the data stored at the specified location to the storage system.

* * * * *